US006669924B1

(12) United States Patent
Kaliaguine et al.

(10) Patent No.: US 6,669,924 B1
(45) Date of Patent: Dec. 30, 2003

(54) MESOPOROUS ZEOLITIC MATERIAL WITH MICROPOROUS CRYSTALLINE MESOPORE WALLS

(75) Inventors: Serge Kaliaguine, Quebec (CA); Trong On Do, Quebec (CA)

(73) Assignee: Universite Laval, Cite Universitaire (CA)

(*) Notice: Subject to any disclaimer, the term of this patent is extended or adjusted under 35 U.S.C. 154(b) by 203 days.

(21) Appl. No.: 09/728,494

(22) Filed: Nov. 24, 2000

Related U.S. Application Data
(60) Provisional application No. 60/166,996, filed on Nov. 23, 1999.

(51) Int. Cl.[7] .......................... C01B 39/04; C01B 39/40
(52) U.S. Cl. ........................ 423/702; 423/707; 423/326; 423/335; 423/DIG. 22; 423/DIG. 27
(58) Field of Search ................................. 423/702, 705, 423/707, 326, 335, DIG. 22, DIG. 27

(56) References Cited

U.S. PATENT DOCUMENTS

| | | | |
|---|---|---|---|
| 4,367,342 A | 1/1983 | Wulff et al. ................. 549/529 |
| 4,410,501 A | 10/1983 | Taramasso et al. ......... 423/326 |
| 4,650,655 A | 3/1987 | Chu et al. .................... 423/328 |
| 4,673,559 A | 6/1987 | Derouane et al. ........... 423/306 |
| 4,859,648 A | 8/1989 | Landis et al. ................ 502/242 |
| 4,880,611 A | 11/1989 | Von Ballmoos et al. .... 423/306 |
| 5,057,296 A | 10/1991 | Beck ............................. 423/277 |
| 5,098,684 A | 3/1992 | Kresge et al. ............... 423/277 |
| 5,102,643 A | 4/1992 | Kresge et al. ............... 423/328 |
| 5,134,242 A | 7/1992 | Le et al. ...................... 585/533 |
| 5,134,243 A | 7/1992 | Bhore et al. ................. 585/533 |
| 5,304,363 A | 4/1994 | Beck et al. ............... 423/328.1 |
| 5,538,710 A | 7/1996 | Guo et al. .................... 423/701 |
| 5,672,556 A | 9/1997 | Pinnavaia et al. ............. 502/63 |
| 5,712,402 A | 1/1998 | Pinnavaia et al. .......... 552/309 |
| 5,726,113 A | 3/1998 | Pinnavaia et al. ............. 502/62 |
| 5,789,336 A * | 8/1998 | Pazzucconi et al. ......... 502/240 |
| 5,795,559 A | 8/1998 | Pinnavaia et al. .......... 423/702 |
| 5,849,258 A * | 12/1998 | Lujano et al. ............... 423/700 |
| 5,942,208 A | 8/1999 | Ryoo et al. .................. 423/705 |
| 5,951,962 A | 9/1999 | Müller et al. ................ 423/702 |
| 5,958,368 A | 9/1999 | Ryoo et al. .................. 423/705 |
| 6,054,111 A * | 4/2000 | Antonietti et al. ........... 423/702 |
| 2001/0031241 A1 * | 10/2001 | Lacombe et al. ............ 423/705 |

FOREIGN PATENT DOCUMENTS

| | | |
|---|---|---|
| EP | 811423 | 12/1997 |
| EP | 987220 | 3/2000 |
| JP | 9067115 | 3/1997 |
| WO | WO 96/31434 | 10/1996 |

OTHER PUBLICATIONS

Kloestra et al., "Mesoporous material containing tectosilicate by pore–wall recrystallization", Chem. Commun., 1997, 2281–82.*

Tanev et al., "Mesoporous silica molecular sieves prepared by ionic and neutral surfactant templating," Chem. Mater., vol. 8, 1996, pp. 2068–2079.*

Bagshaw et al., "Templating of mesoporous molecular sieves by nonionic polyethylene oxide surfactants," Science, vol. 269, 1995, pp. 1242–1244.*

(List continued on next page.)

*Primary Examiner*—David Sample
(74) *Attorney, Agent, or Firm*—Shanks & Herbert

(57) ABSTRACT

The invention relates to a mesoporous zeolitic material having a stereoregular arrangement of uniformly-sized mesopores with diameters ranging from 20 to 500 Å and walls having a microporous nanocrystalline structure. The mesopore walls have a stereoregular arrangement of uniformly-sized micropores with diameters less than 15 Å. The mesoporous zeolite material according to the invention displays both the catalytic properties associated with zeolites containing strong Brönsted acid sites and the large mesopore surface area associated with mesoporous molecular sieves.

31 Claims, 25 Drawing Sheets

OTHER PUBLICATIONS

Meier et al. Atlas of Zeolite Structure Types, 1992, pp. 138–139.*
Kloetstra et al., Chemical Communications, 1997, No. 23, p. 2181–2182.
Yang et al., Nature, 1998, vol. 396, p. 152–155.
Karlsson et al., Proc. Int. Zeolite Conf., 1999, vol. 1, p. 713–718.
Huang et al., Chemical Abstracts, 1999, abstract No. XP–002146186.
Guo et al., Chemical Abstracts, 1999, abstract No. XP–002146185.
Miyazawa et al., Chemical Communications, 2000, No. 21, p. 2121–2122.
Sayari et al., Catalysis Letters, 1998, vol. 49, No. 3/04, p. 147–153.
Yang et al., Chemistry of Materials, 1999, vol. 11, No. 10, p. 2813–2826.
Karlsson et al., Microporous and Mesoporous Materials, 1999, vol. 27, No. 2–3, p. 181–192.
Zhao et al., Science, 1998, vol. 279, p. 548–552.
Yang et al., Nature, 1998, vol. 396, p. 152–155.
Bagshaw et al., Science, 1995, vol. 269, p. 1242–1244.
Ryoo et al., J. Phys. Chem. 1996, vol. 100, p. 17718–17721.
Jacobs et al., J. Chem. Soc., Chem. Comm., 1981, p. 591–593.
Schoeman, Stud. Sufr. Sci. Catal., 1997, vol. 105, p. 647–654.
Davis et al., Chem. Mater., 1992, vol. 4, No. 4, p. 756–768.
On et al., Journal of Catalysis, 1995, vol. 157, p. 235–243.
Ravishankar et al., J. Phys. Chem. B, 1998, vol. 102, p. 2633–2639.
Shimizu et al., Chemistry Letters, 1996, p. 403–404.
On et al., Microporous and Mesoporous Materials 1998, vol. 22, p. 211–224.
On et al., Catalysis Letters, 1997, vol. 44, p. 171–176.
Stucky et al., Mesoporous Molecular Sieves, 1998, vol. 117, p. 1–12.
Pinnavaia et al., Mesoporous Molecular Sieves, 1998, vol. 117, p. 23–36.
Kresge et al, Nature, 1992, vol. 359, p. 710–712.
Beck et al., J. Am. Chem. Soc., 1992, vol. 114, p. 10834–10843.
Vartuli et al., Mesoporous Molecular Sieves, 1998, vol. 117, p. 13–19.
Brinker, Curr. Opin. Solid State Mater. Sci., 1996, vol. 1, p. 798–805.
On et al., J. Phys. Chem., 1996, vol. 100, p. 6743–6748.
Tanev et al., Nature, 1994, vol. 368, p. 321–323.
Ying, Mesoporous Molecular Sieves, 1998, vol. 117, p. 85–87.
Yang et al., Chem. Mater., 1999, vol. 11, p. 2813–2826.
Zhao et al., J. Am. Chem. Soc., 1998, vol. 120, No. 24, p. 6024–6036.

* cited by examiner

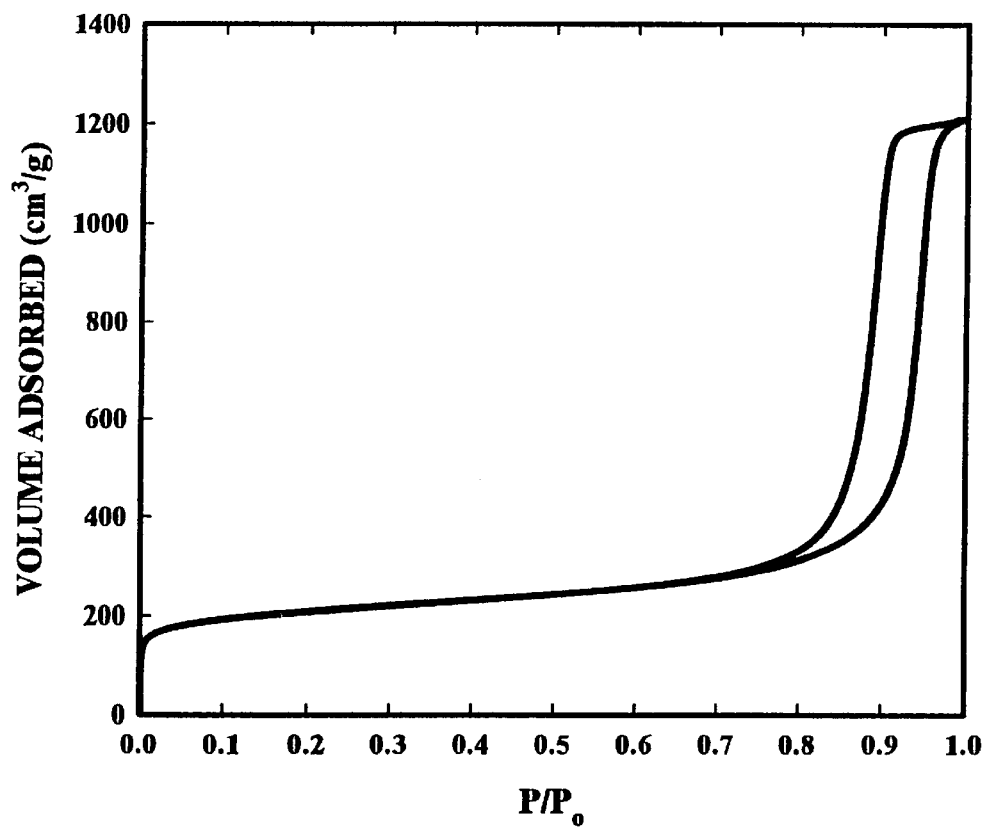

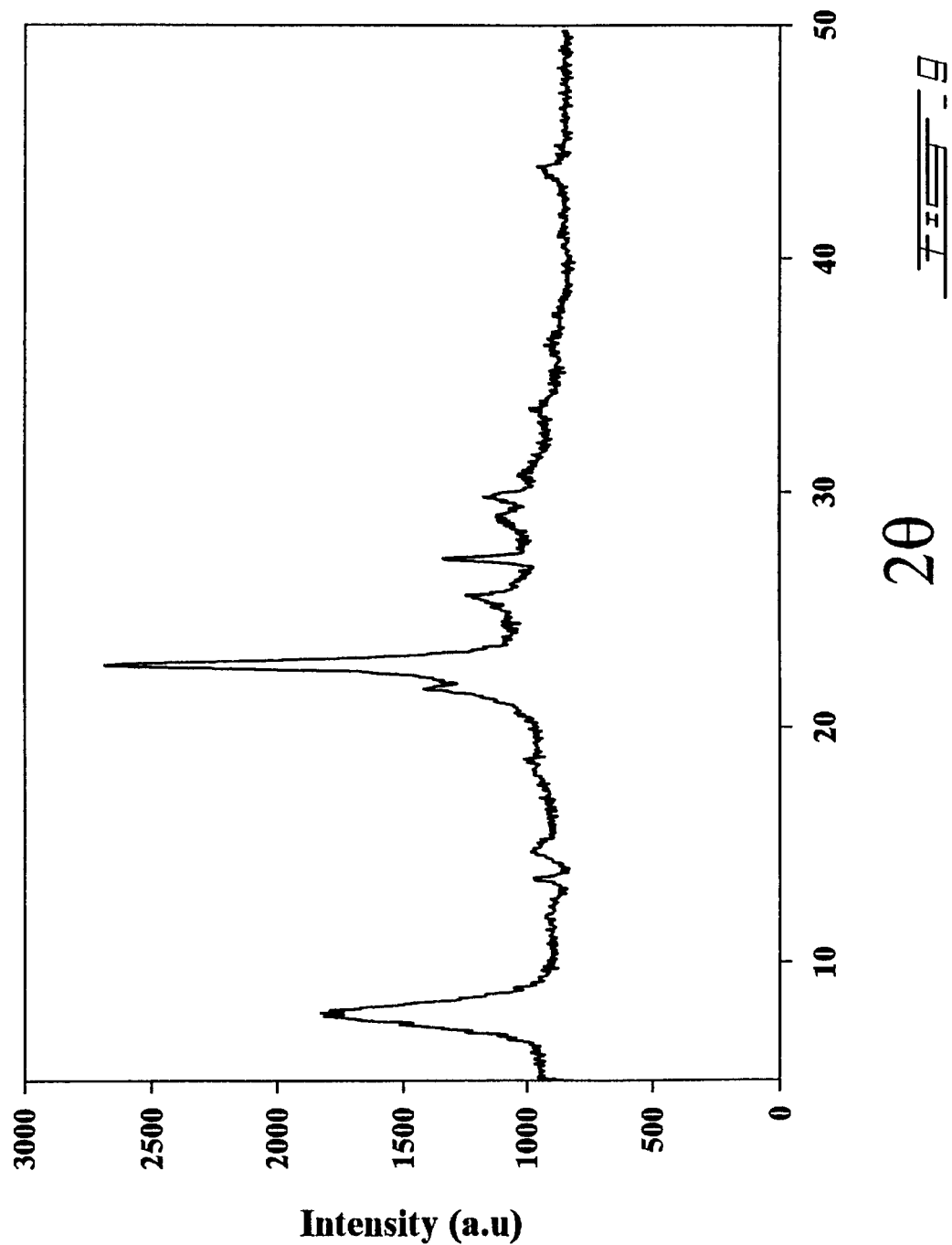

50 nm 50 nm

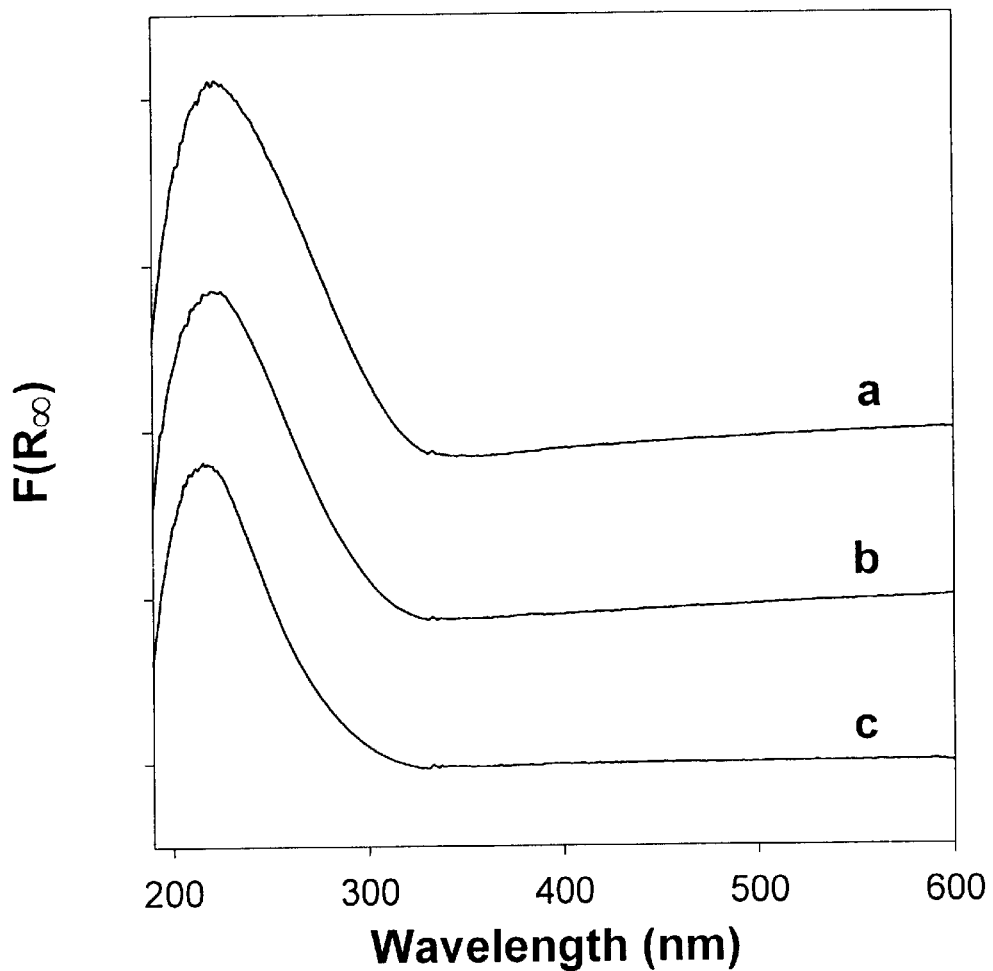
FIG_18A

MESOPOROUS ZEOLITIC MATERIAL WITH MICROPOROUS CRYSTALLINE MESOPORE WALLS

This application claims the benefit of provisional application No. 60/166,966, filed Nov. 23, 1999.

BACKGROUND OF THE INVENTION

The present invention pertains to improvements in the field of catalytic materials. More particularly, the invention relates to a mesoporous zeolitic material having microporous crystalline mesopore walls and to a process of preparing same.

Zeolites and related crystalline molecular sieves are widely used as catalysts in the industry since they possess catalytically active sites as well as uniformly sized and shaped micropores, that allow for their use as shaped selective catalysts in, for instance, oil refining, petrochemistry and organic synthesis. However, due to the pore size constraints, the unique catalytic properties of zeolites are limited to reactant molecules having kinetic diameters below 10 Å.

Recently, a group of researchers at Mobil Co. reported a series of mesoporous molecular sieves, named M41 S series, in U.S. Pat. Nos. 5,057,296 and 5,102,643. These molecular sieves with mesopore diameters of 15–100 Å overcome the limitation of microporous zeolites and allow the diffusion of larger molecules. These materials, however, are amorphous solids. Amorphous silica-aluminas have much weaker acid sites than zeolites and thus do not exhibit the spectacular catalytic properties of acidic zeolites. Moreover, their hydrothermal stability is low and, as a consequence, their industrial use as catalysts is very limited.

SUMMARY OF THE INVENTION

It is therefore an object of the present invention to provide a new type of catalytic material having a bimodal pore structure, which overcomes the limitations of both zeolites and mesoporous molecular sieves.

According to one aspect of the invention, there is provided a mesoporous zeolitic material having a stereoregular arrangement of uniformly-sized mesopores with diameters ranging from 20 to 500 Å and walls having a microporous nanocrystalline structure. The mesopore walls have a stereoregular arrangement of uniformly-sized micropores with diameters less than 15 Å.

The present invention also provides, in another aspect thereof, a method of preparing a mesoporous zeolitic material as defined above. The method according to the invention comprises the steps of:
  a) providing a mesoporous silica having a stereoregular arrangement of uniformly-sized mesopores having diameters ranging from 20 to 500 Å and walls having an amorphous structure;
  b) impregnating the mesoporous silica with a zeolite-templating compound;
  c) subjecting the impregnated mesoporous silica obtained in step (b) to a heat treatment at a temperature and for a period of time sufficient to cause transformation of the amorphous structure into a microporous nanocrystalline structure, thereby obtaining a mesoporous zeolitic material with mesopore walls having a stereoregular arrangement of uniformly-sized micropores with diameters less than 15 Å; and
  d) removing the zeolite-templating compound from the mesoporous zeolitic material obtained in step (c).

The expression "nanocrystalline structure" as used herein refers to a structure comprising crystals with sizes of the order of 10 nanometers or less.

BRIEF DESCRIPTION OF THE DRAWINGS

In the accompanying drawings:

FIG. 3 shows $N_2$ adsorption/desorption isotherms of [2]UL-ZSM-5[1.0];

FIG. 9 shows the X-ray diffraction pattern of a mesoporous zeolitic material designated UL-beta and obtained in Example 3 hereinbelow;

FIG. 16a shows a TEM images of a calcined mesoporous titania-silica starting material (Ti/Si=1.5%) prepared in Example 4 from $SiCl_4$;

DESCRIPTION OF PREFERRED EMBODIMENTS

Figure 1:
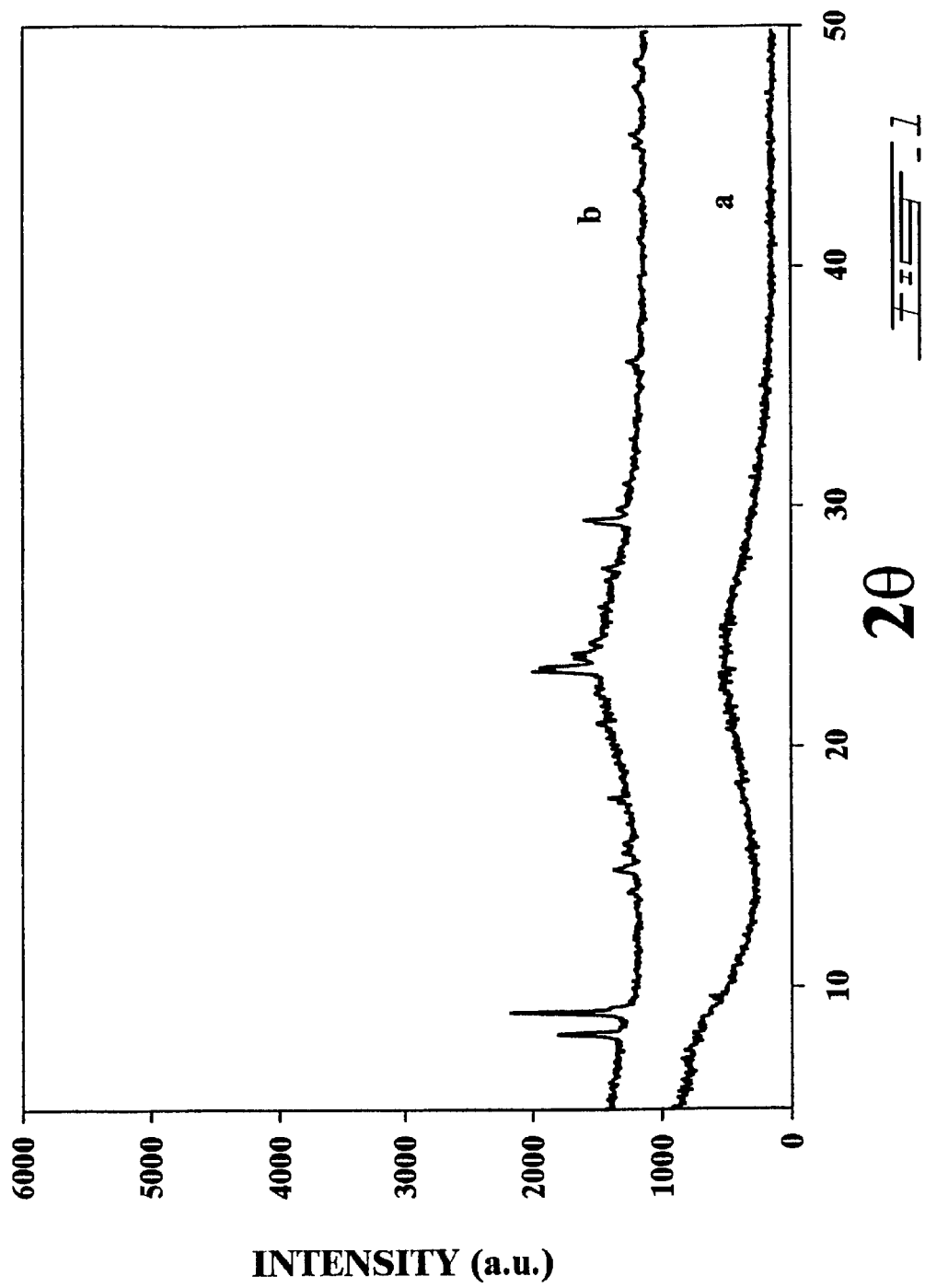
FIG. 1 shows X-ray diffraction patterns of the mesoporous starting material used in Example 1 hereinbelow and of a mesoporous zeolitic material designated [2] UL-ZSM-5[1.0] and obtained in Example 1.

The mesoporous zeolitic material according to the invention has a stereoregular arrangement of uniformly-sized mesopores with diameters of 20 to 500 Å, preferably 30 to 200 Å. The mesopore walls have a stereoregular arrangement of uniformly-sized micropores with diameters less than 15 Å, preferably 3 to 12 Å. Advantageously, the mesopore walls each have a thickness of at least 40 Å, preferably 40 to 50 Å.

The mesoporous silica which is used as starting material for preparing the mesoporous zeolitic material according to the invention can be prepared by the method described for example in U.S. Pat. No. 5,942,208 or 5,958,368. It is also possible to employ the methods described by D. Zhao et al in Science, Vol. 279, p. 548 (1998) or by P. Yang et al in Nature, Vol. 396, p. 152 (1998). The teachings of these patents and publications are incorporated herein by reference. A particularly preferred method of preparing the desired starting material includes the steps of:

i) dissolving a micelle-forming surfactant in a polar solvent to form a solution;

ii) mixing the solution obtained in step (i) with a silica precursor;

iii) heating the mixture resulting from step (ii) to cause simultaneous formation of tubular micelles and precipitation of amorphous silica thereonto; and iv) separating the tubular micelles with the amorphous silica thereon from the solvent.

Use is preferably made of a non-ionic micelle-forming surfactant such as a poly(alkylene oxide) block copolymer. Examples of suitable poly(alkylene oxide) block copolymers which can be used include those sold under the trademarks BRIJ 56 ($C_{16}H_{33}(OCH_2CH_2)_{10}OH$), BRIJ 58 ($C_{16}H_{33}(OCH_2CH_2)_{20}OH$), BRIJ 76 ($C_{18}H_{37}(OCH_2CH_2)_{10}OH$), PLURONIC P-123 ($HO(CH_2CH_2O)_{20}(CH_2CH(CH_3)O)_{70}(CH_2CH_2O)_{20}H$) and PLURONIC F-127 ($HO(CH_2CH_2O)_{106}(CH_2CH(CH_3)O)_{70}(CH_2CH_2O)_{106}H$) The use of a non-ionic micelle-forming surfactant enables one to obtain a mesoporous silica with mesopore walls each having a thickness of at least 40 Å. The polar solvent used for dissolving the micelle-forming surfactant can be water, a lower alkanol or a mixture thereof. Ethanol is preferred.

The silica precursor can be any suitable compound which gives silica as a result of a physical or chemical treatment. Examples are hydrolyzable organic silicon compounds, such as alcoholates or chelates. In addition, the silica precursor can be used in the form of a soluble salt, such as $SiCl_4$. When a mesoporous silica containing aluminum or titanium is desired, the silica precursor is used in combination with an aluminum or titanium source.

In step (iii), the mixture resulting from step (ii) is heated to cause simultaneous formation of tubular micelles and precipitation of amorphous silica thereonto. This step is preferably carried out at a temperature ranging from 40 to 150° C. The tubular micelles with the amorphous silica thereon are thereafter separated from the solvent, for example, by filtration or by evaporating the solvent.

The resulting surfactant-containing mesoporous silica can be used directly in step (b) of the method according to the invention. Alternatively, the surfactant can be removed prior to step (b), for example, by calcination. If a surfactant-containing mesoporous silica is used as starting material, removal of the surfactant is generally effected during removal of the zeolite-templating compound in step (d), for example, by calcining the mesoporous zeolitic material obtained in step (c).

Examples of suitable zeolite-templating compounds which can be used in step (b) to impregnate the mesoporous silica include tetraethylammonium hydroxide and tetrapropylammonium hydroxide. The use of tetraethylammonium hydroxide enables one to obtain a mesoporous zeolitic material with mesopore walls formed of beta-zeolite. The zeolite-templating compound is preferably used in the form of an aqueous solution. If desired, prior to step (b), the mesoporous silica can be treated under vacuum at a temperature ranging from 25 to 100° C., preferably 60° C., in order to control the amount of physisorbed water left in the impregnated mesoporous silica during step (b).

The heat treatment to which the impregnated mesoporous silica is subjected in step (c) is generally carried out at a temperature of 80 to 180° C., preferably 120 to 130° C., and for a period of time of 1 hour to 10 days, preferably 24 to 48 hours. This causes transformation of the aforesaid amorphous structure into a microporous nanocrystalline structure, resulting in the desired mesoporous zeolitic material.

As previously indicated, removal of the zeolite-templating compound in step (d) can be effected by calcining the mesoporous zeolitic material obtained in step (c). Preferably, prior to step (d), the mesoporous zeolitic material obtained in step (d) is subjected to a drying treatment.

The mesoporous zeolite material according to the invention displays both the catalytic properties associated with zeolites containing strong Brönsted acid sites and the large mesopore surface area associated with mesoporous molecular sieves. A large zeolite surface area is accessible through large pores in the mesoporous range, which allows the catalytic conversion of large molecules.

Since the zeolite particles are crystallized from the very thin walls of mesoporous molecular sieve materials, the method of the invention allows for the production of a zeolite phase in the form of nanocrystals, the external surface of which constitutes the mesopore wall surface. One of the consequences of this small particle size is that the molecules, which access to intraparticles micropores, will diffuse on very short distances within the zeolite structure. Therefore, several problems associated with the occurrence of secondary reactions will be circumvented, for example, in the production of reformulated gasolines by catalytic cracking.

The mesoporous zeolitic material according to the invention can also be used as adsorbent, in particular for water adsorption. Because of the very short micropore diffusional pathways, both adsorption and desorption are much faster than with conventional zeolites, even though the overall capacity of adsorption is higher. Thus, the mesoporous zeolitic materials of the invention can be used in several commercial adsorption/desorption processes.

The method according to the invention is applicable to the preparation of a very large series of mesoporous zeolitic materials since there are more than 140 zeolite crystal structures and about 30 related AlPO materials.

The following non-limiting examples illustrate the invention.

EXAMPLE 1

Preparation of UL-ZSM-5

A series of mesoporous zeolitic materials designated UL-ZSM-5 and having mesopore walls formed of ZSM-5 zeolite, in which the percentages of Al/Si atomic ratio were varied from 0.5 to 3.0% was prepared using silicon tetrachloride ($SiC_4$) and aluminum chloride ($AlCl_3$) as silica precursor and aluminum source, and a poly(alkylene oxide) block copolymer sold under the trademark PLURONIC P-123 and tetrapropylammonium hydroxide (TPAOH) as micelle-forming surfactant and zeolite-templating compound, respectively.

Step 1: Preparation of Mesoporous Starting Material 5 g of PLURONIC P-123 were dissolved in 50 g of ethanol. To this solution, 0.05 mol. of $SiCl_4$ was added followed by an appropriate amount of $AlCl_3$ with vigorous stirring. The mixture was kept under stirring for 24 hours at room temperature, then heated at 40° C. in order to accelerate hydroylsis of $SiCl_4$ and $AlCl_3$ and evaporate the ethyl alcohol, and also cause simultaneous formation of tubular micelles and precipitation of amorphous $SiO_2 \cdot Al_2O_3$ thereonto. The surfactant-containing mesoporous material thus obtained was recovered, washed and air-dried at room temperature.

Step 2: Preparation of Mesoporous Zeolitic Material

The surfactant-containing mesoporous starting material was first dried under vacuum at 60° C. for 24 hours. Then 20 g of the mesoporous starting material was impregnated with 40 g of a 10 wt. % aqueous solution of TPAOH (free from inorganic alkali). The impregnated solid was heated at 60° C. for 24 h in order to eliminate water and left over night at room temperature before being dried under vacuum for about 24 hours at room temperature. The dried, impregnated solid was thereafter transferred into a TEFLON (trademark) lined autoclave and heated at 130° C. for 24 hours to cause transformation of its amorphous structure into a microporous nanocrystalline structure. Since the quantity of water adsorbed on the solid plays an important role in the crystallization, the partly crystalline solid was further crystallized at the same temperature (130° C.) for a given time after introducing a small amount of water. Because the solid state crystallization continues in the presence of this small amount of water, the method permits to control the crystallinity and the mesopore size of the mesoporous zeolitic material obtained. The product was washed with distilled water, dried in air at 80° C. and finally calcined at 500° C. for 6 hours to remove the surfactant and the zeolite-templating compound, the product being heated from room temperature to 500° C. at a heating rate of 1° C./min.

The UL-ZSM-5 materials were analyzed by X-ray diffraction (XRD), transmission electron microscopy (TEM) and infrared spectroscopy, and their physico-chemical properties are reported in Table 1 hereinbelow. The XRD patterns of the mesoporous starting material and of UL-ZSM-5 are shown in FIG. 1. The mesoporous starting material having mesopore walls with an amorphous structure (no high-angle diffractions, FIG. 1a) constitutes a starting material from which nanocrystalline domains can nucleate within the mesopore walls. The XRD pattern of UL-ZSM-5 (FIG. 1b) shows broad peaks which match those of ZSM-5 zeolite. These peaks grow in intensity as the crystallization time is increased. These data indicate that the mesopore walls comprise nanocrystals of this zeolite.

Figure 2A:
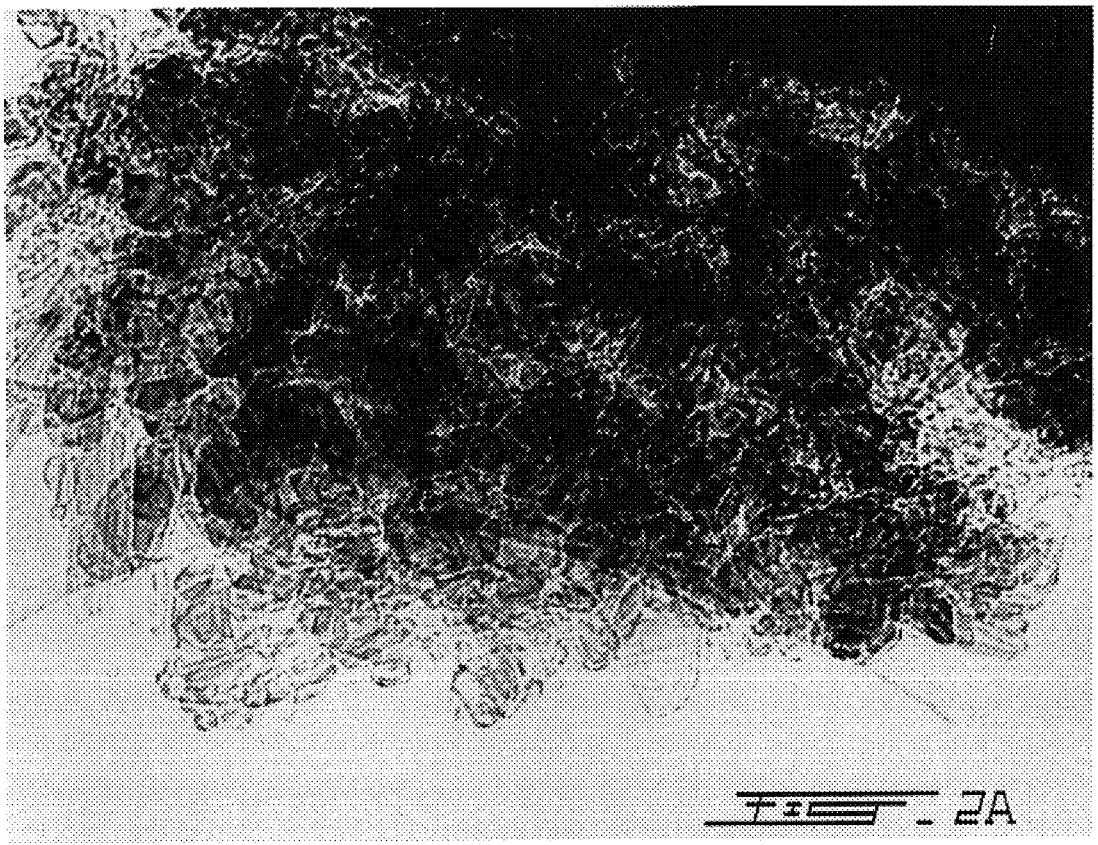
FIGS. 2a and 2b show bright-field and dark-field transmission electron microscope (TEM) images on the same area of [2]UL-ZSM-5[1.0]
Figure 2B:
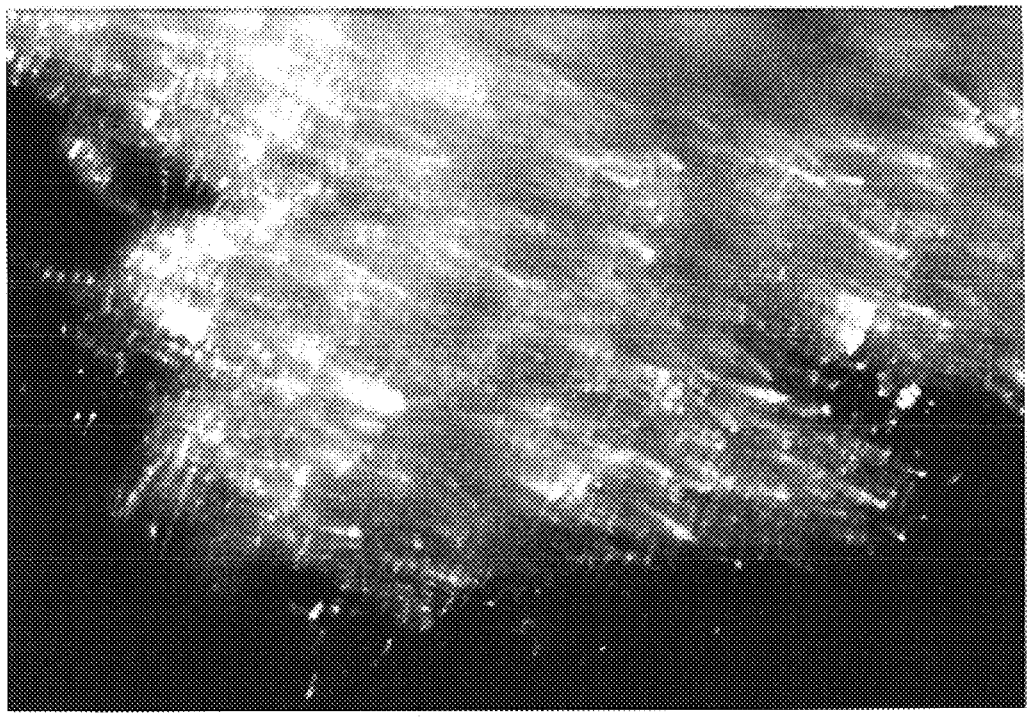

FIGS. 2a and 2b show bright-field and dark-field TEM images recorded on the same area of UL-ZSM-5. As shown in the dark-field image (FIG. 2B), the nanocrystals are uniformly embedded in a continuous amorphous inorganic matrix to form semicrystalline wall structures while preserving the mesoporous structure.

Figure 4:
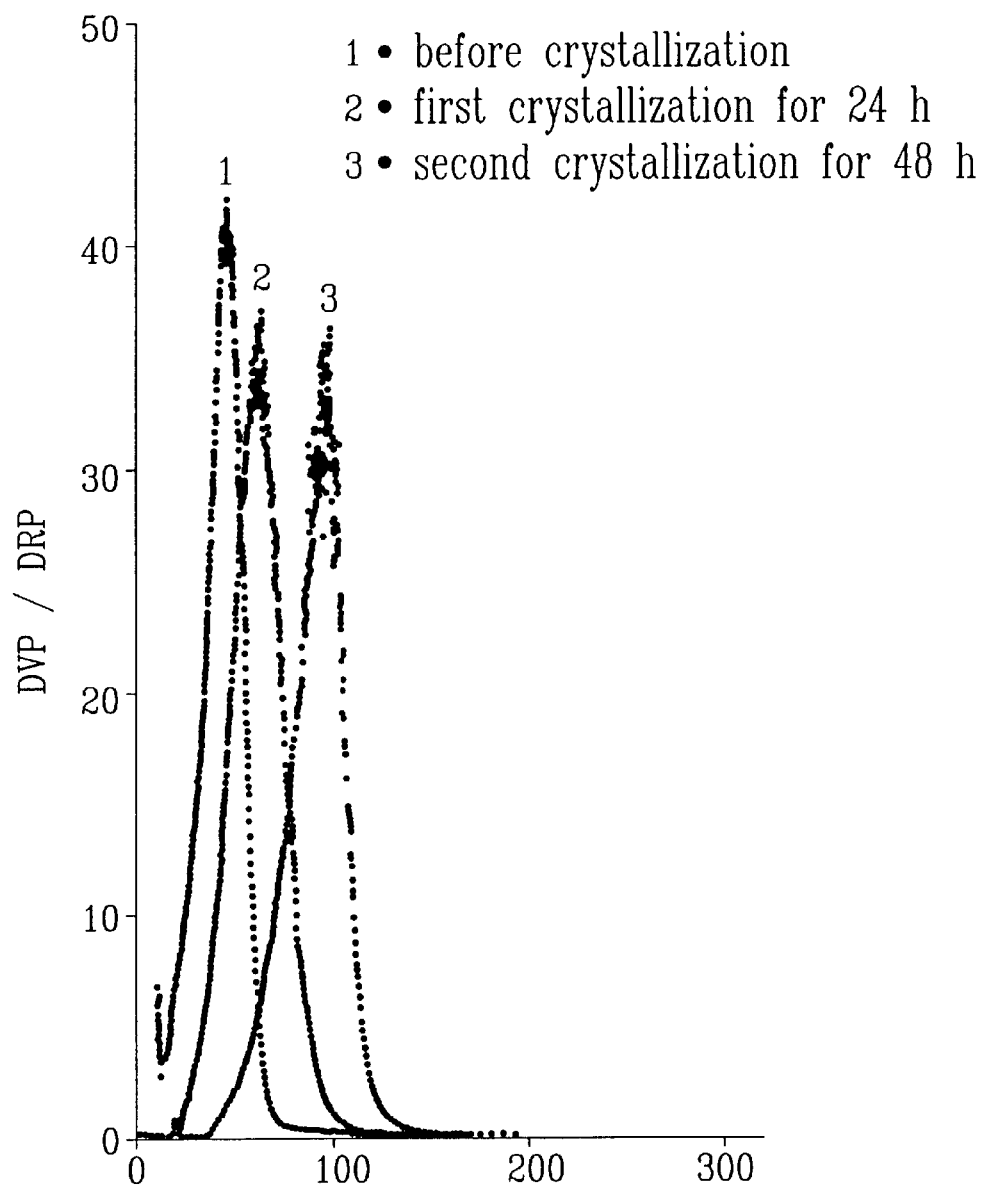
FIG. 4 shows the evolution of the mesopore diameters of [2]UL-ZSM-5[1.0] as a function of crystallization time.

The $N_2$ adsorption/desorption isotherms shown in FIG. 3 and obtained for different UL-ZSM-5 samples indicate that the UL-ZSM-5 samples have the typical behavior of a mesoporous molecular sieve with a mesopore volume saturation capacity of $\approx 1.6$ $cm^3/g$ (Table 1). These $N_2$ adsorption/desorption isotherms are representative of micro/mesoporous materials. Barrett-Joyner-Halenda (BJH) analyses show that the UL-zeolites samples exhibit mesopore diameters of 100, 130, 180 Å. The pore diameters of the UL-ZSM-5 samples are substantially larger than that of the mesoporous starting material (FIG. 4 and Table 1).

The UL-ZSM-5 samples exhibit a Fourier transform infrared (FTIR) absorption band at 561/547 (doublet) which is not present in the mesoporous starting material. The band around 550 $cm^{-1}$ has been assigned to the asymmetric stretching mode in five-membered ring blocks. Splitting of this lattice-sensitive band into a doublet at 561–547 $cm^{-1}$ is characteristic of a nanophase of ZSM-5 structure.

EXAMPLE 2

Preparation of UL-silicalite

A mesoporous zeolitic material designated UL-silicalite and having mesopore walls formed of silicalite was prepared according to the same procedure as described in Example 1 and under the same operating conditions, with the exception that no aluminum source was added to the solution during the first step. In the second step, the impregnated solid was transferred into a TEFLON lined autoclave and heated at 130° C. for 48 hours without being dried under vacuum for about 24 hours at room temperature. In this case, a small amount of water was still physisorbed in the solid.

The physico-chemical properties of the UL-silicalite obtained are reported in Table 1.

Figure 5:
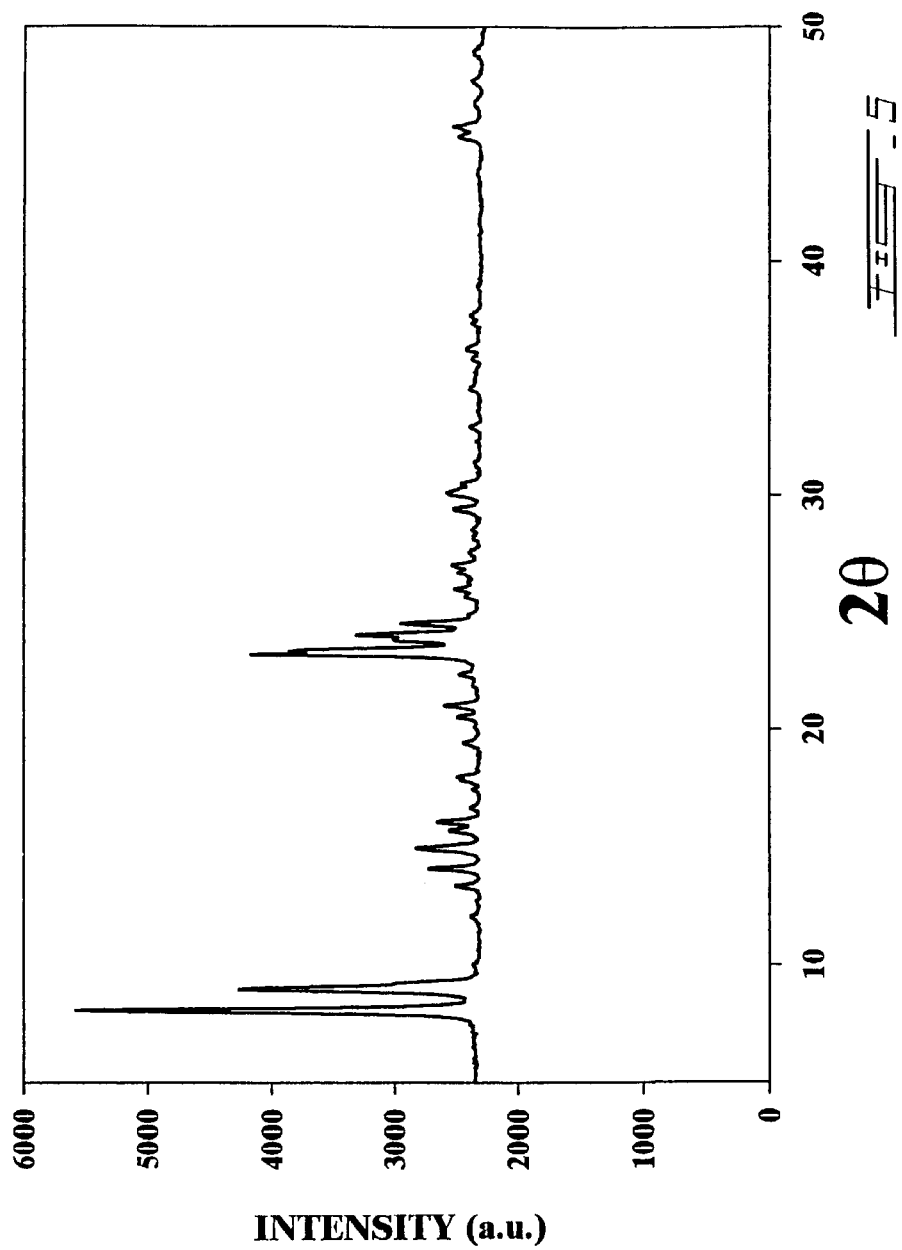
FIG. 5 shows the X-ray diffraction pattern of a mesoporous zeolitic material designated UL-silicalite and obtained in Example 2 hereinbelow.
Figure 6:
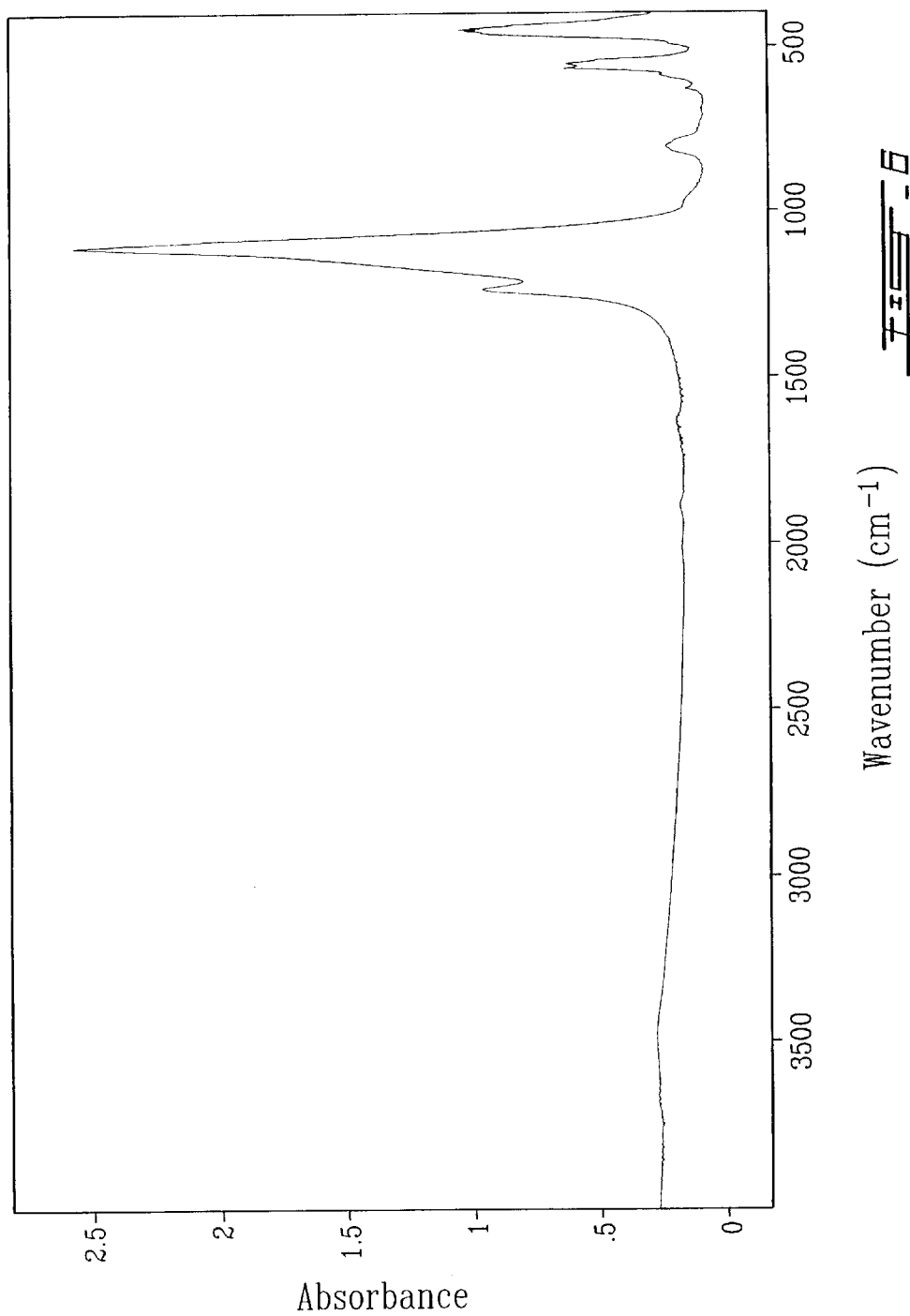
FIG. 6 shows the Fourier transform infrared (FTIR) spectrum of UL-silicalite.
Figure 7:
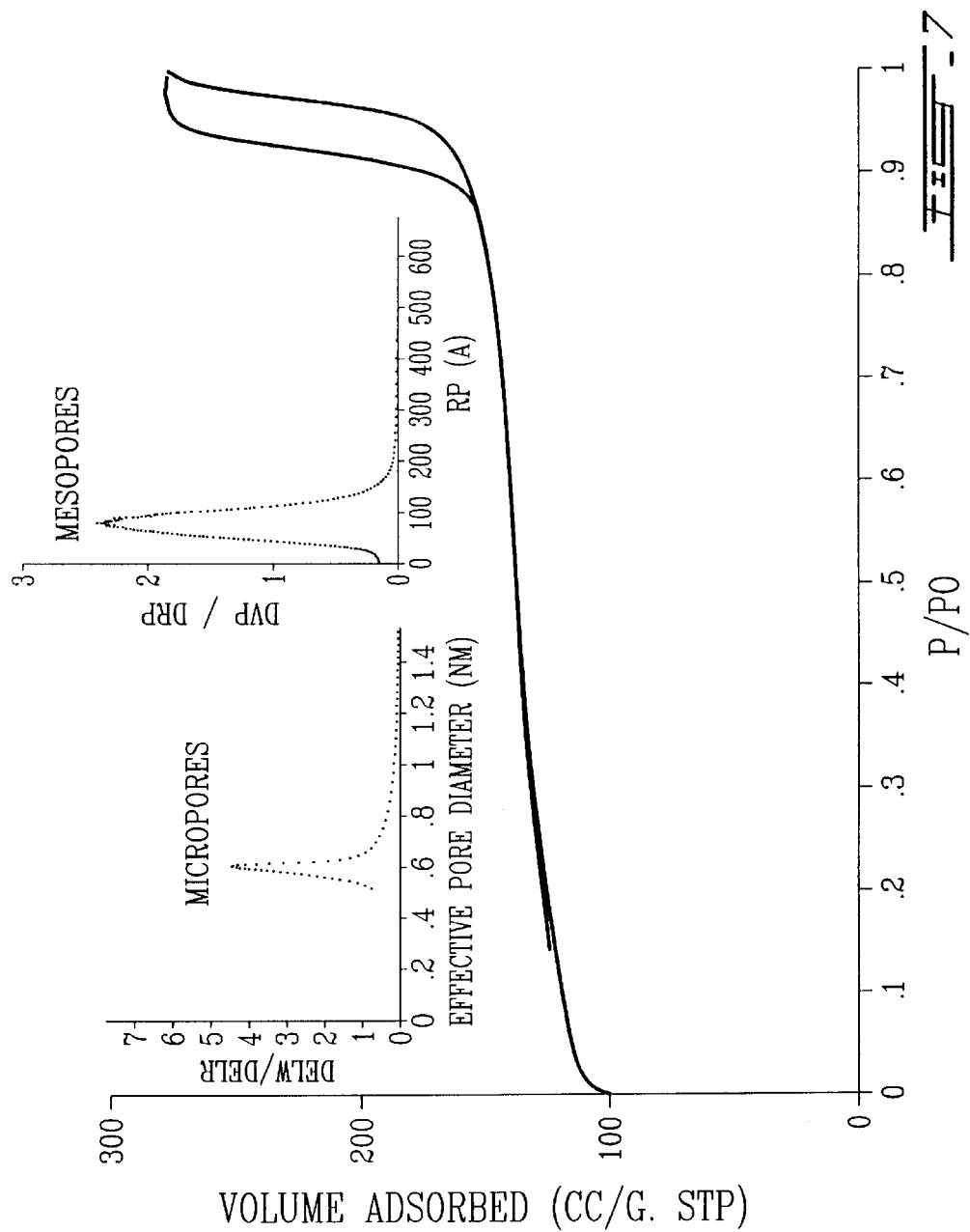
FIG. 7 shows $N_2$ adsorption/desorption isotherms of UL-silicalite.

The XRD pattern of the UL-silicalite is shown in FIG. 5. This pattern is similar overall to the typical XRD pattern of silicalite. FIG. 6 shows a FTIR absorption band at 561/547 $cm^{-1}$ (doublet) which is characteristic of nanophase silicalite. TEM image (not shown) of the material exhibits uniform nanocrystals with a diameter of 80–100 nm. These data indicate that most of the amorphous phase was transformed to a nanocrystalline phase. The adsorption/desorption isotherm (FIG. 7) is also indicative of micro/mesoporosity in the material. A flat curve at low relative pressures corresponds to filling of micropores. The upward turn of the isotherm at higher relative pressure indicates filling of mesopores. This sample exhibits a mesopore diameter of ~180 Å and a micropore diameter of 6 Å. The total surface area of the UL-silicalite sample is 420 m$^2$/g: 310 m$^2$/g is due to micropores and 110 m$^2$/g due to mesopores (Table 1).

Figure 8A:
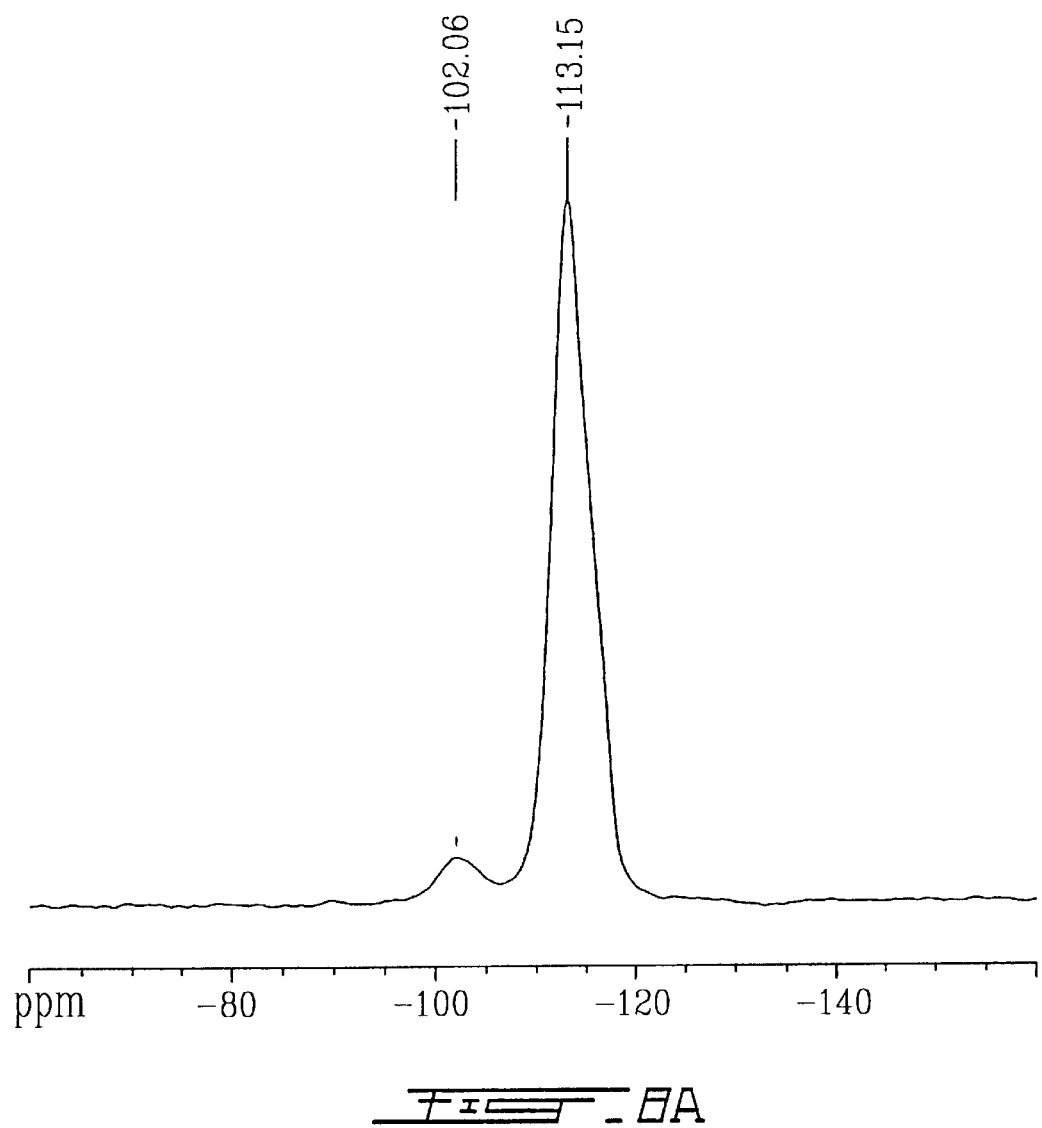
FIG. 8a shows the $^{29}Si$ MAS NMR spectrum of UL-silicalite.
Figure 8B:
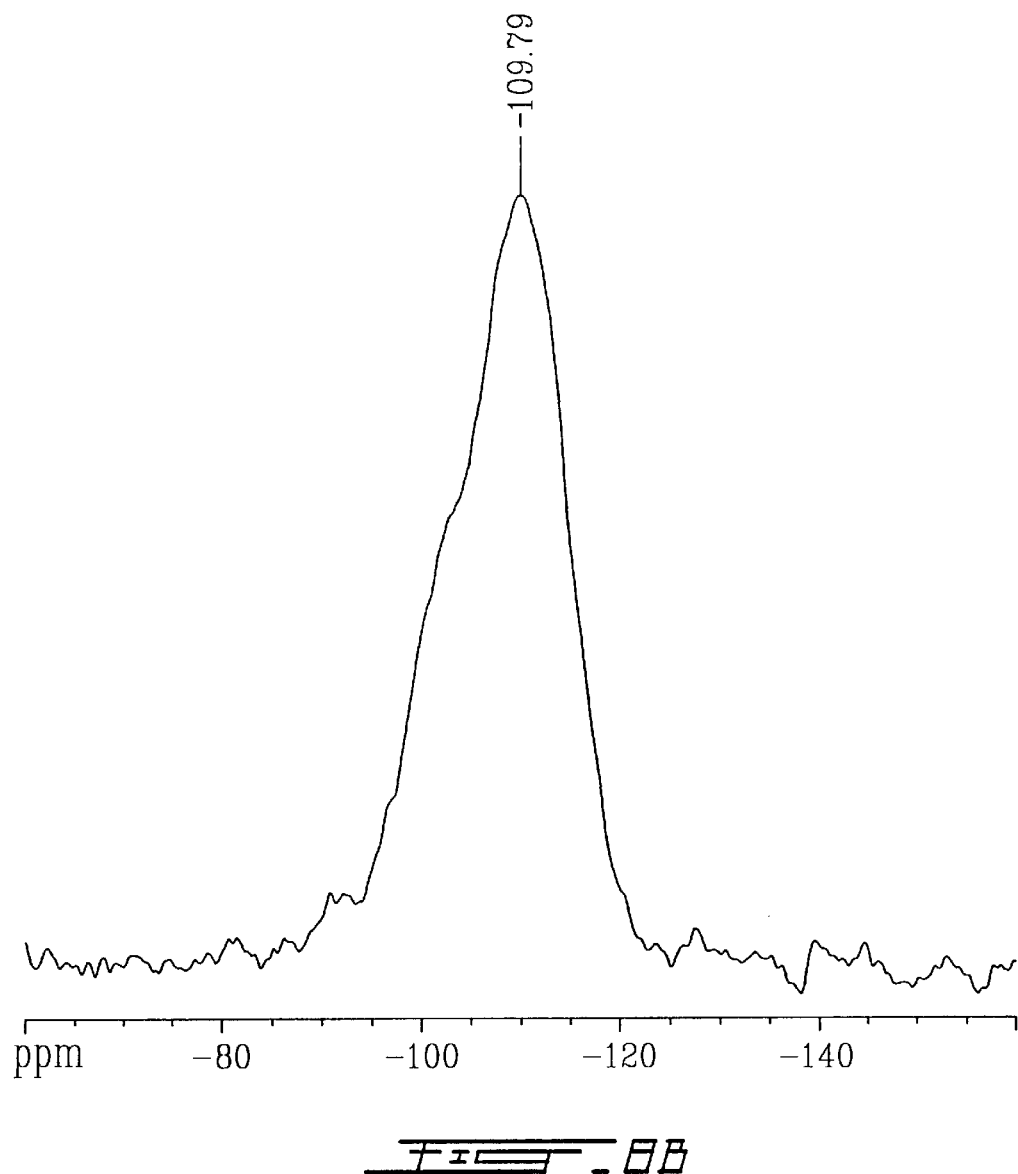
FIG. 8b shows the $^{29}Si$ MAS NMR spectrum of the mesoporous starting material used in Example 2.

The $^{29}$Si MAS NMR spectrum (FIG. 8a) of the UL-silicalite sample shows a main resonance centered at −113 ppm, which is attributed to Q$^4$ silicon of the silicalite framework. Only a weak resonance (~5%), attributable to Q$^3$ silicon from surface hydroxyl groups or to an amorphous component, is observed at 104 ppm. By contrast, the mesoporous starting material has a $^{29}$Si MAS NMR spectrum (FIG. 8B) typical of amorphous materials.

EXAMPLE 3

Preparation of UL-beta

A mesoporous zeolitic material designated UL-beta and having mesopore walls formed of beta-zeolite was prepared using an alkali (Na$^+$, K$^+$) containing tetraethylammonium hydroxide (TEAOH) as zeolite-templating compound and a Al/Si atomic ratio of 1%.

The material was prepared according to the same procedure as described in Example 1 and under the same operating conditions, with the exception that alkali-containing TEAOH (TEAOH/SiO$_2$=0.1, Na+K/SiO$_2$=3) was used as zeolite-templating compound instead of tetrapropylammonium hydroxide and the impregnated solid was not treated under vacuum at room temperature before being transferred into a TEFLON-lined autoclave. The physico-chemical properties of the UL-beta obtained are reported in Table 1.

Figure 10:
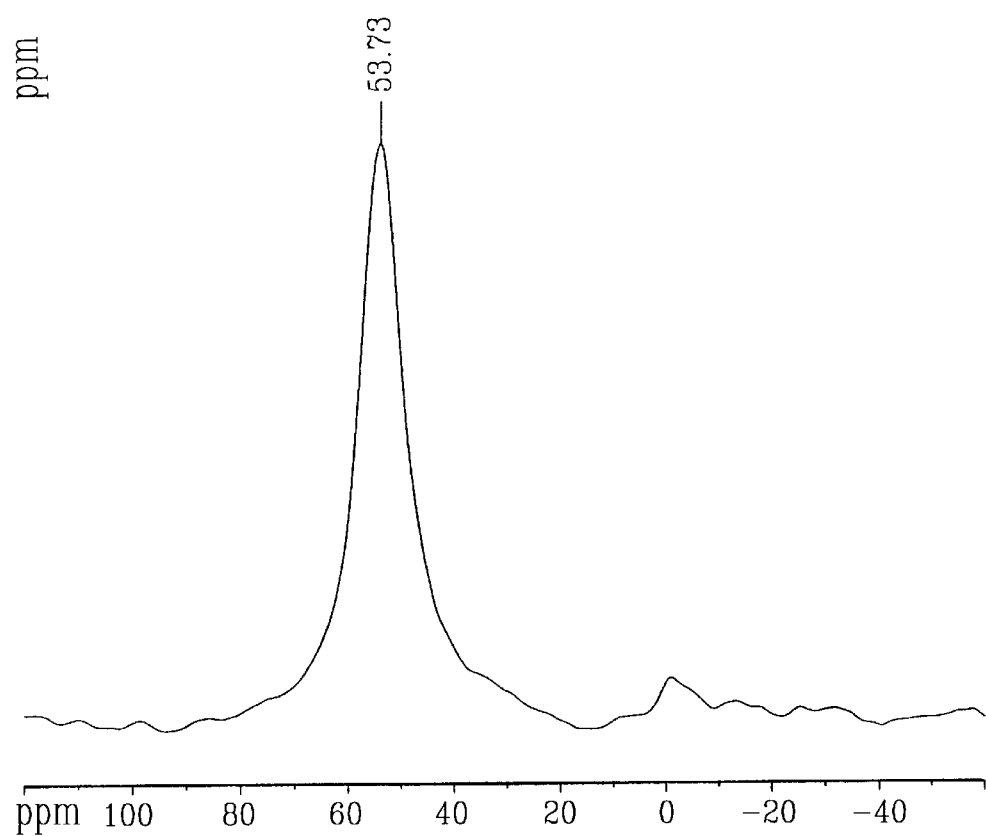
FIG. 10 shows the $^{27}Al$ MAS NMR spectrum of UL-beta.
Figure 11:
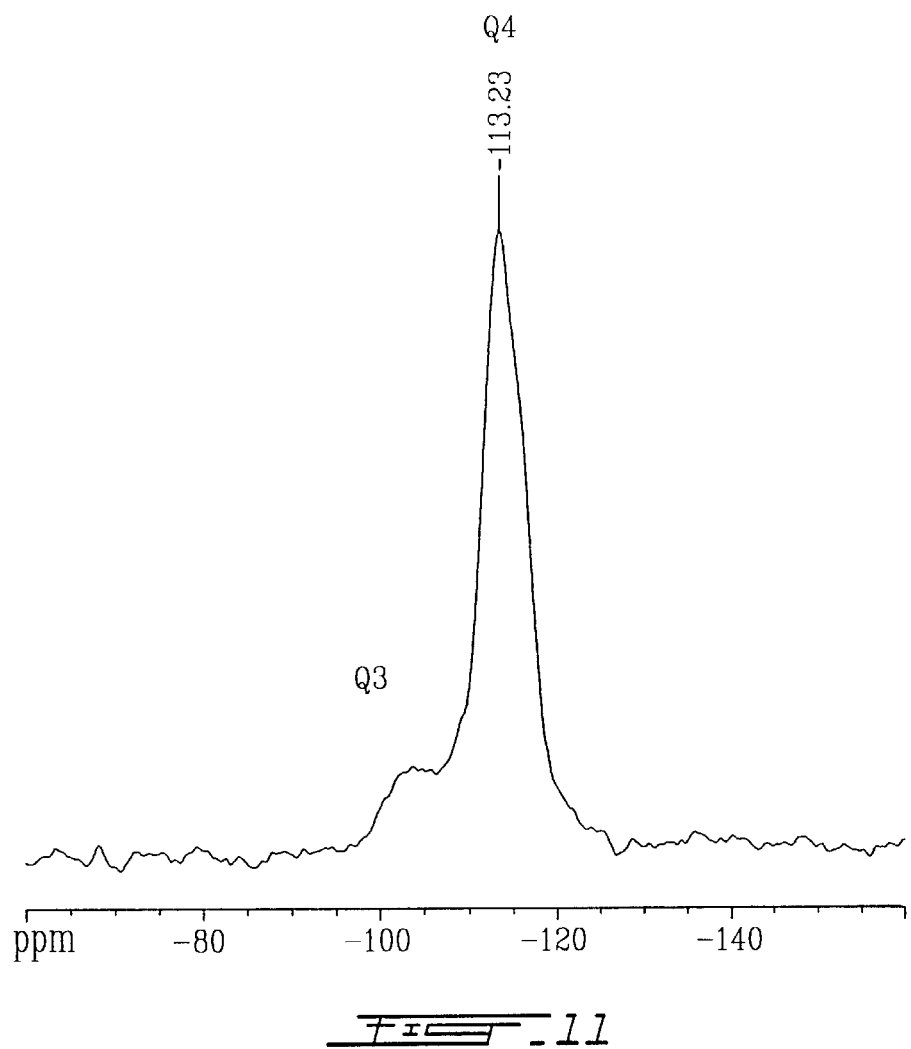
FIG. 11 shows the $^{29}Si$ MAS NMR spectrum of UL-beta.

The XRD pattern (FIG. 9) of the sample indicates that the material contains a crystalline beta-zeolite compared to the standard highly crystalline beta-zeolite. The $^{27}$Al MAS NMR spectrum (FIG. 10) of this sample exhibits a single resonance centered at 53 ppm which is characteristic of tetrahedral aluminum. This indicates that most of aluminum species is incorporated into the material framework. The sample also shows a typical $^{29}$Si MAS NMR spectrum (FIG. 11) of beta-zeolite: a main Q$^4$ peak at −113 ppm and weak Q$^3$ peak at −104 ppm.

EXAMPLE 4

Preparation of UL-TS-1

A series of mesoporous zeolitic materials designated UL-TS1 and having mesopore walls formed of titanium-containing silicalite was prepared using PLURONIC P-123 and TPAOH as micelle-forming surfactant and zeolite-templating compound, respectively.

Step 1: Preparation of Mesoporous Starting Material

Route I: The preparation was effected according to the same procedure as described in Example 1 and under the same operating conditions, with the exception that tetrapropyl orthotitanate was used instead of aluminum chloride and stirring was effected for 12 hours instead of 24 hours.

Route II: A mesoporous titanium-containing silica (Ti/Si= 1.5%) having an amorphous structure was prepared using tetraethyl orthosilicate (TEOS) as a silica precursor in a stron acidic medium (2M HCl solution), according to the procedure described in the aforementioned Zhao et al reference.

Step 2: Preparation of Mesoporous Zeolitic Material

This step was carried out according to the same procedure as described in Example 1 and under the same operating conditions. They are respectively designated as I-[x]UL-TS1 [y] and II-[x]UL-TS1[y], where x and y are the crystallization time in days and percentage of Ti/Si, atomic ratio. Their physico-chemical properties are reported in Table 2 hereinbelow.

Figure 12:
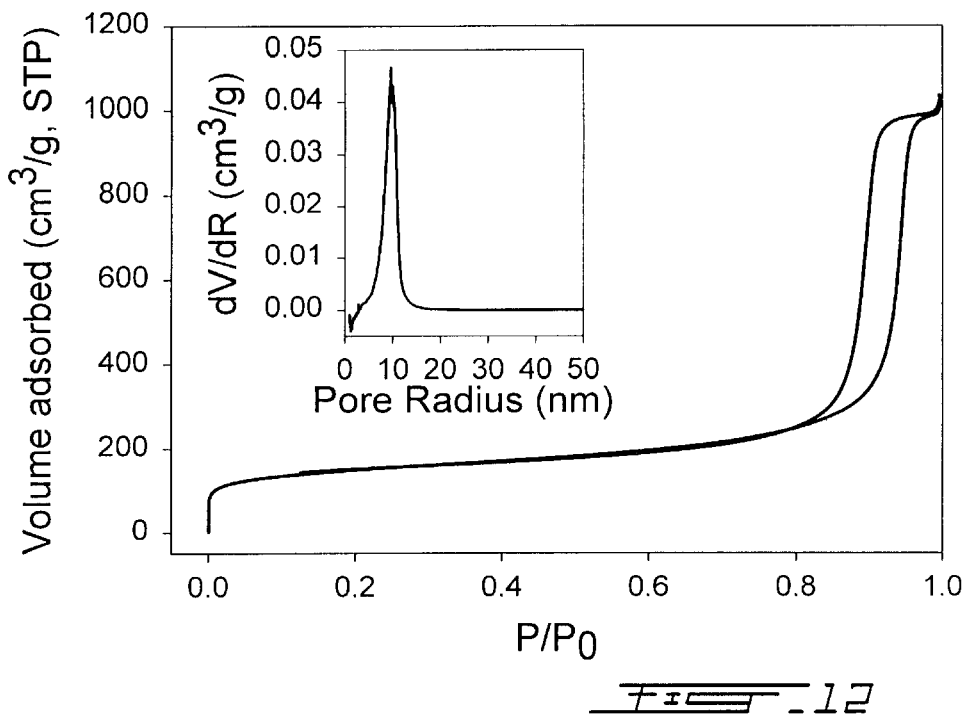
FIG. 12 shows $N_2$ adsorption/desorption isotherms of a mesoporous zeolitic material designated I-[5]UL-TS1[1.5] and obtained in Example 4 hereinbelow, the insert showing the BJH pore radius distribution calculated from the desorption isotherm.
Figure 13:
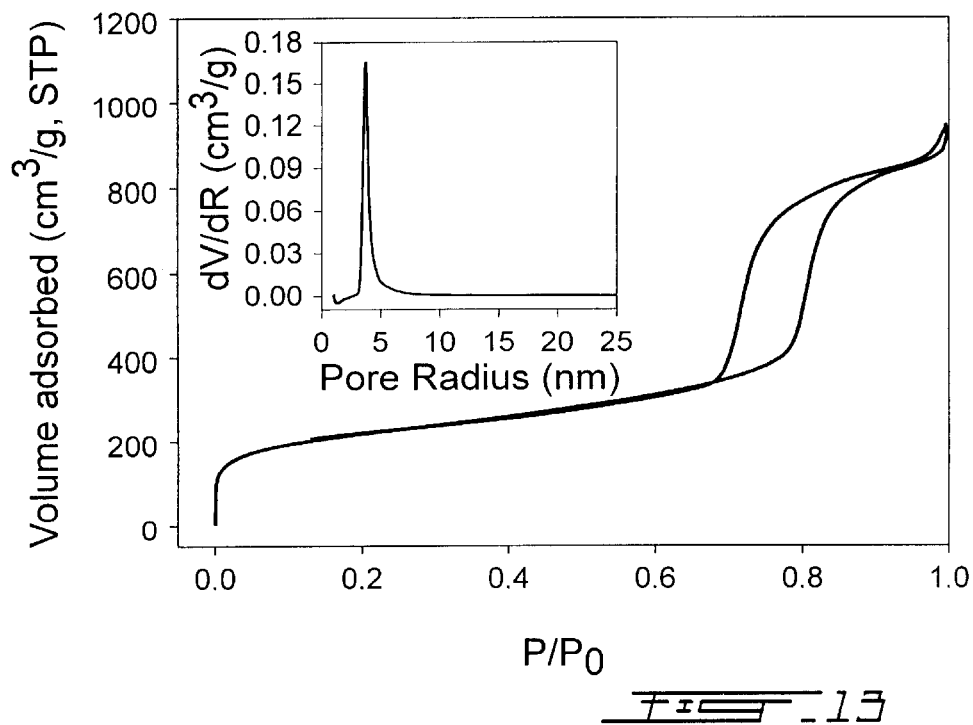
FIG. 13 shows $N_2$ adsorption/desorption isotherms of a mesoporous zeolitic material designated II-[5]UL-TS1[1.5] and obtained in Example 4, the insert showing the BJH pore radius distribution calculated from the desorption isotherm.

FIGS. 12 and 13 show N$_2$ adsorption/desorption isotherms of I-[5]UL-TS1[1.5] and II-[5]UL-TS1[1.5] samples after 5 days of crystallization at 120° C. The isotherms exhibit a typical type IV, as defined by IUPAC. At low relative P/P$_0$ pressure, a steep rise in uptake, followed by a flat curve, corresponds to filling of micropores with nitrogen. A sharp inflection at higher pressures (e.g. in P/P$_0$ range from 0.7 to 0.9) is characteristic of capillary condensation. The P/P$_0$ position of the inflection point is clearly related to a diameter in the mesopore range and the sharpness of these steps indicates the uniformity of the pore size distribution. All UL-TS1 samples gave typical type IV adsorption/desorption isotherms with a H$_1$ hysteresis loop and steep rises at low relative P/P$_0$ pressure indicating the presence of both mesopores and micropores in UL-TS 1, even in the calcined [0]UL-TS 1 sample. With increasing crystallization time, the UL-TS-1 materials gave isotherms with similar inflection, but with reduced sharpness and a shift toward higher P/P$_0$ values over a larger P/P$_0$ range (not shown).

Figure 14A:
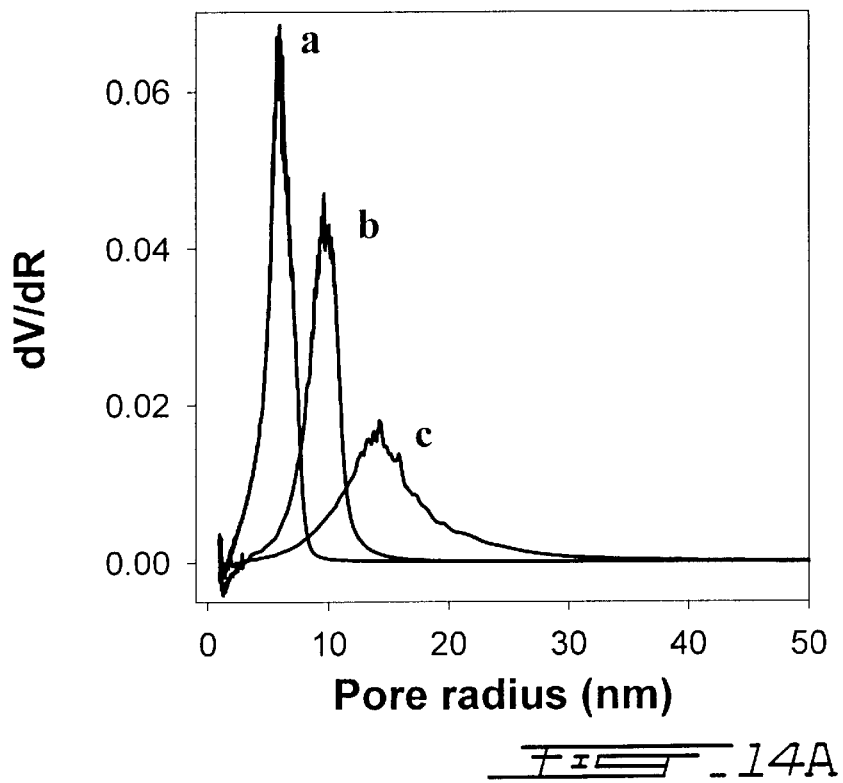
FIG. 14a shows BJH pore radius distribution curves for the I-UL-TS1[1.5] sample at various times of crystallization: a) 3 days, b) 5 days and c) 10 days.
Figure 14B:
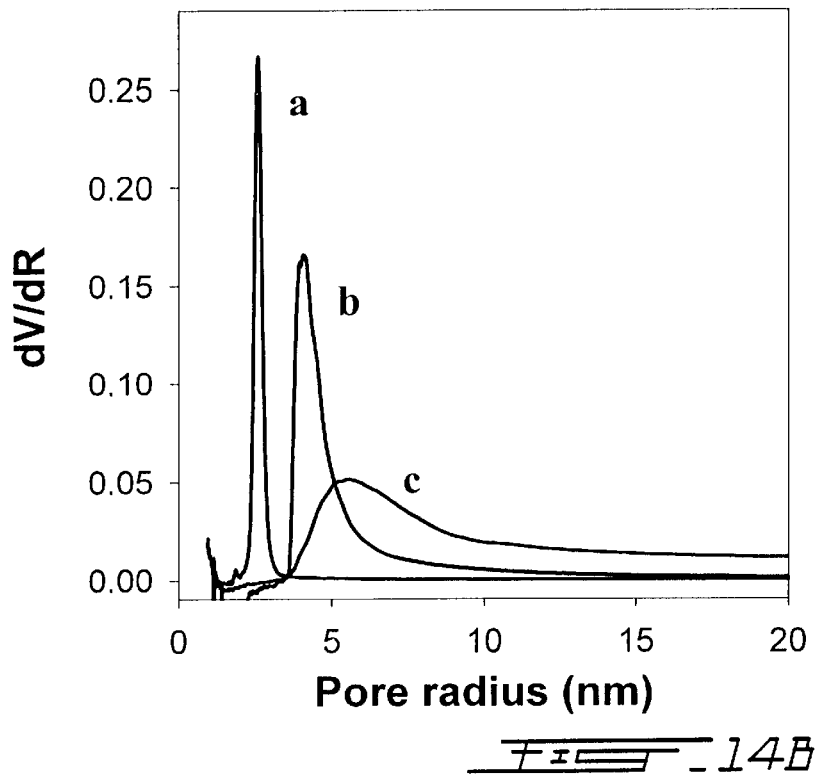
FIG. 14b shows BJH pore radius distribution curves for the II-UL-TS1[1.5] sample at various times of crystallization: a) 0 days, b) 5 days and c) 10 days.

The BJH pore radius distribution can be calculated from the Kelvin equation and has been widely used for mesoporous materials. Average BJH values of the pore radius are given in Table 1. The pore size distribution is more clearly shown in FIG. 14. A significant increase in the pore diameter and a broader pore size distribution were observed, as a function of crystallization time. This indicates some modification of the tubular channels of these materials during crystallization.

The total specific surface area S$_{BET}$ of both series of samples is reported in Table 1. As the crystallization time is increased, S$_{BET}$ varies from 820 to 580 m$^2$/g for I[x]UL-TS1[1.5] and from 790 to 520 m$^2$/g for II[x]UL-TS1[1.5]. The mesopore surface area S$_{BJH}$ of the same materials varies from 645 to 180 m$^2$/g and 710 to 145 m$^2$/g respectively. Simultaneously, the micropore volume increases from 0.045 to 1.159 cm$^3$/g and from 0.025 to 0.149 cm$^3$/g for the same series of samples. The mesopore volume and radius are reported on Table 1.

Figure 15A:
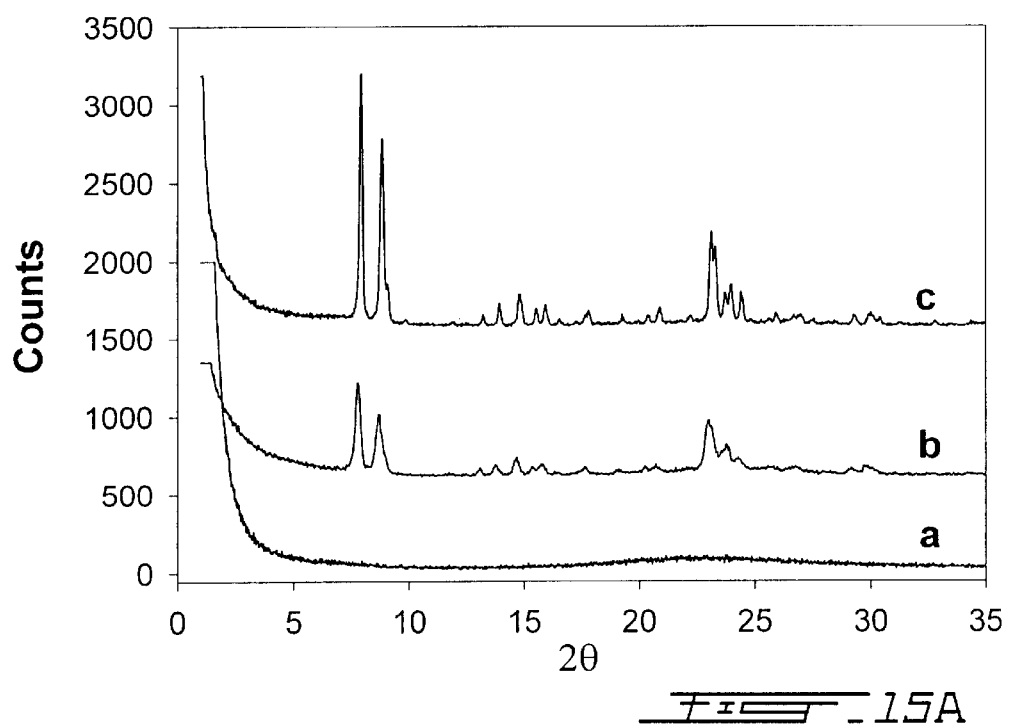
FIG. 15a shows X-ray diffraction patterns of the I-UL-TS 1[1.5] sample after various times of crystallization: a) 0 days, b) 8 days and c) 10 days.
Figure 15B:
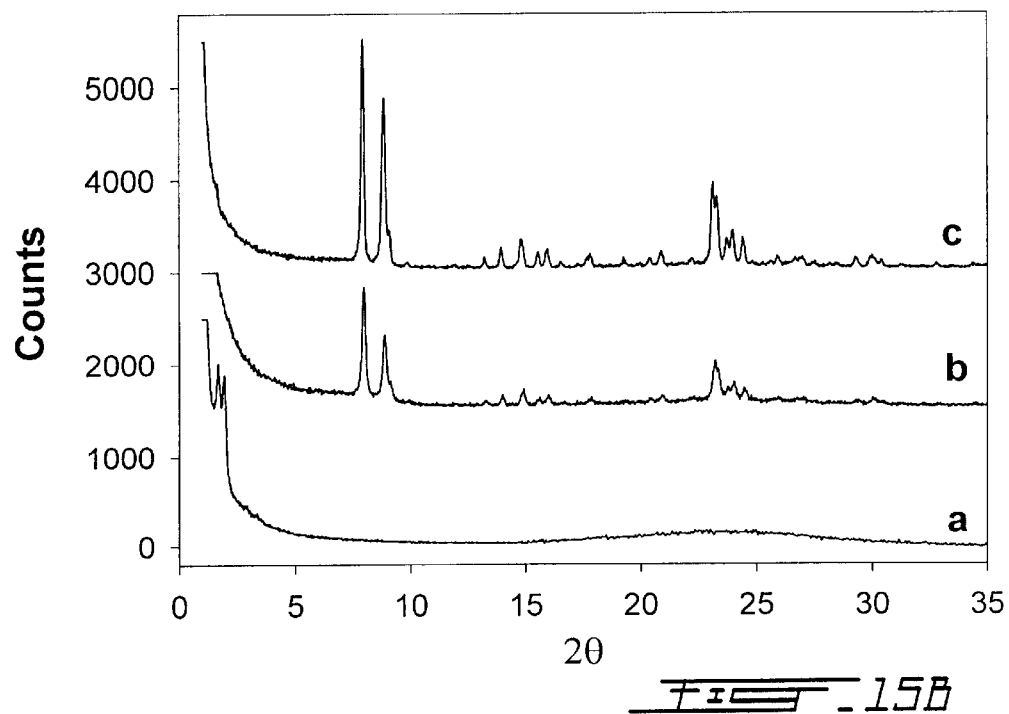
FIG. 15b shows X-ray diffraction patterns of the I-UL-TS1[1.5] sample after various times of crystallization: a) 0 days, b) 8 days and c) 10 days.

The crystalline phase in UL-TS 1 materials upon crystallization was characterized by wide-angle XRD diffractograms, as shown in FIGS. 15a and 15b for the I-UL-TS1[1.5] and 1I-UL-TS1[1.5] samples, respectively. The mesoporous starting material with amorphous walls (only the broad feature of amorphous phase appears, FIGS. 15A,a and 15B,a) provides a starting material from which nano-crystalline domains can nucleate within the walls. The XRD diffractograms of the UL-TS1[1.5] samples in FIGS. 15A,b and 15B,b show broad peaks, which match those of ZSM-5. These peaks grow in intensity as the crystallization time is increased (FIGS. 15A,c and 15B,c). The relative increase in the intensity of the characteristic triplet in the 2θ range 21.5–25.5° are shown in Table 1. Considering TS-1 as 100% crystalline, 80% crystallinity was reached after 10 days of crystallization at 120° C. following synthesis route II. The XRD spectra observed after different times of crystallization are quite similar for both series of I-UL-TS1[1.5] and II-UL-TS1[1.5] prepared by the two different routes. These data indicate that the initially amorphous walls of the two mesoporous materials are progressively transformed into crystalline nanoparticles.

Figure 16B:
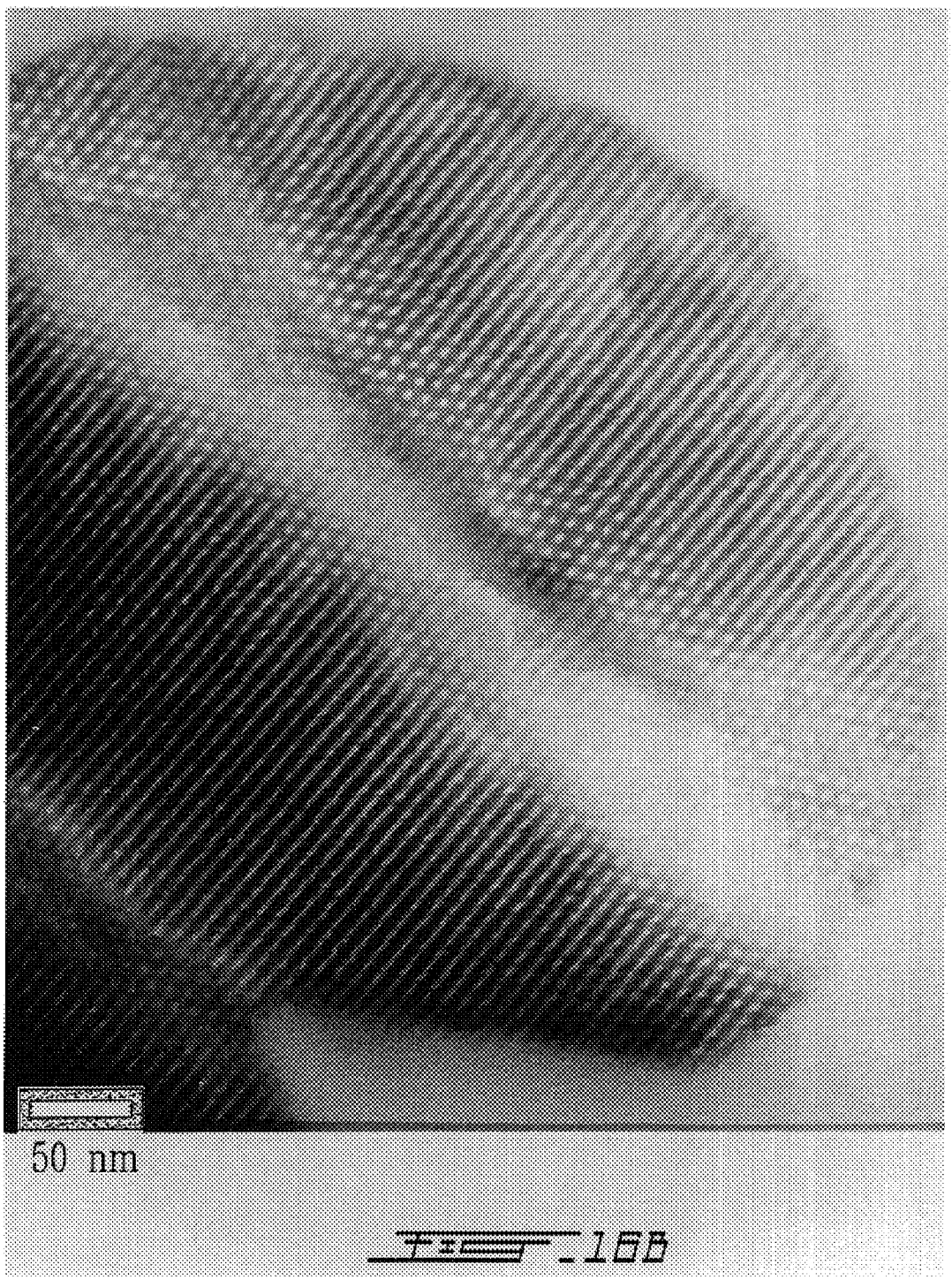
FIG. 16b shows a TEM image of a calcined mesoporous titania-silica starting material (Ti/Si=1.5%) prepared in Example 4 from tetraethyl orthosilicate.
Figure 17A:
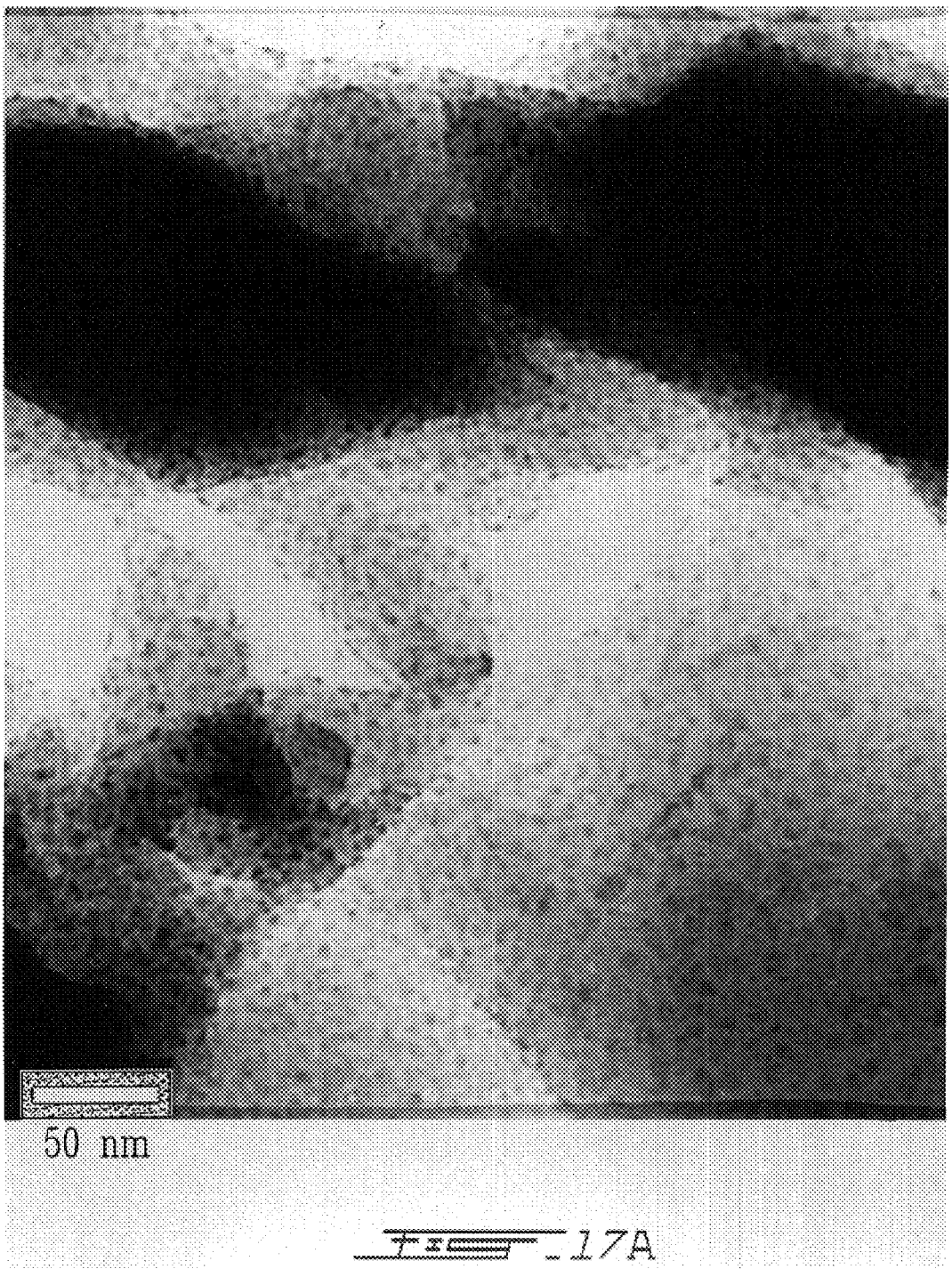
FIG. 17a shows a TEM image of a mesoporous zeolitic material designated in I-[10]UL-TS1[1.5] and obtained in Example 4.
Figure 17B:
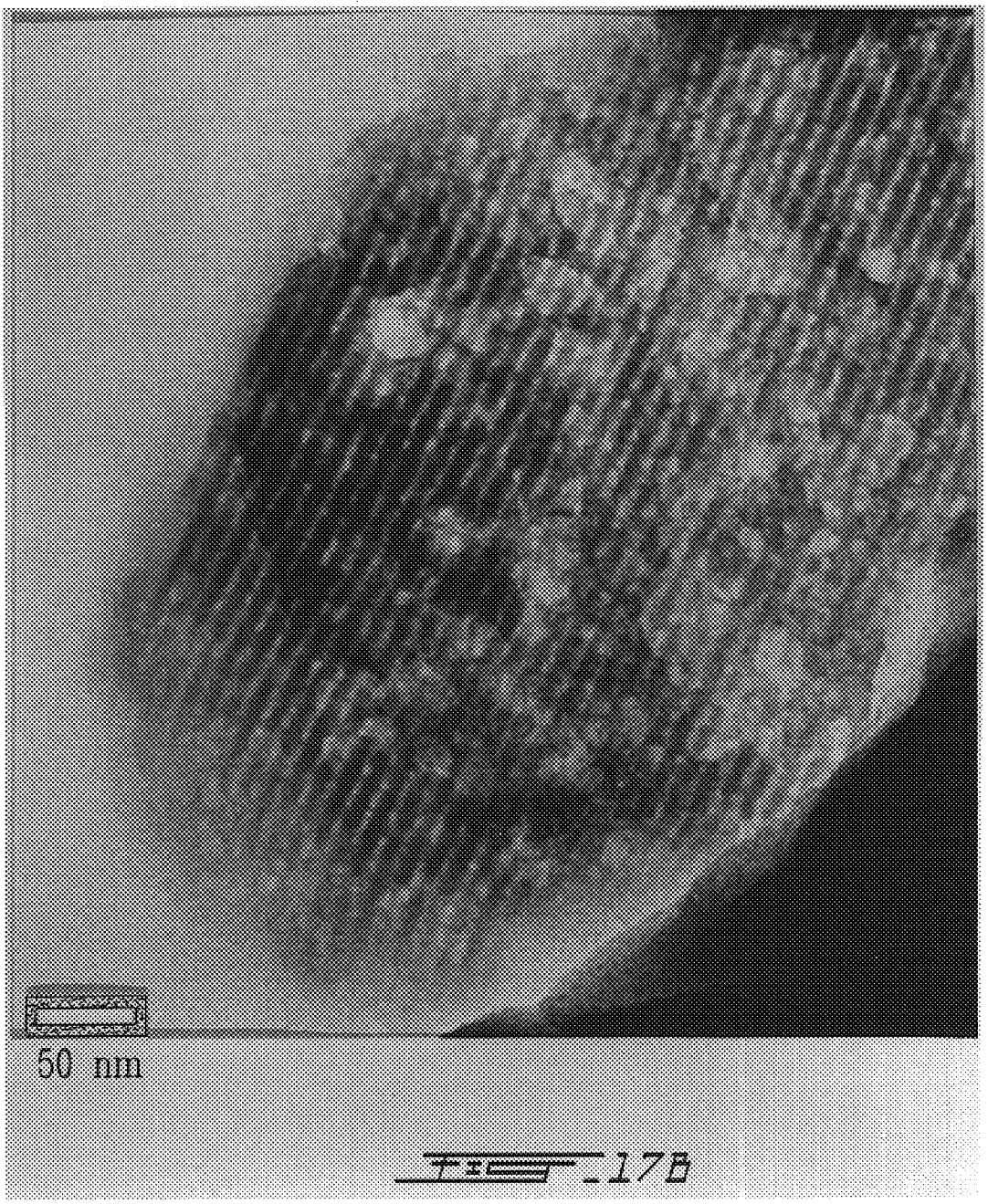
FIG. 17b shows a TEM image of a mesoporous zeolitic material designated in II-[10]UL-TS1[1.5] and obtained in Example 4.

The pore structure of mesoporous materials is directly visible by transmission electron microscopy. The mesoporous starting material prepared from SiCl$_4$ (route I) appears to be of a uniform pore size with a highly disordered pore structure. This is reminiscent of MSU-1 and KIT-1 mesoporous materials described by S. A. Bagshaw et al in Science, Vol. 269, p. 1242 (1995) and by R. Ryoo et al in J. Phys. Chem., Vol. 100, p. 17718 (1996), which have wormhole-like pore frameworks (FIG. 16A). In contrast, a well-ordered pore structure (FIG. 16B) was observed for the starting material prepared from TEOS (route II). FIGS. 17A and 17B show the TEM images of the I-[10]UL-TS1[1.5] and II-[10]UL-TS1[1.5] samples after 10 days of crystallization. FIG. 17A shows that after crystallization in the presence of TPAOH, the mesopores of the MSU type precursor (FIG. 16A) retains their size and morphology. The wormhole pore lattice is however still present and microdomains of the order of ~10 nm are observed. The size of MFI microdomains calculated using the Scherrer formula from the line broadening in the XRD spectrum of this sample is ~20 nm, which is consistent with these observations. The specific surface calculated for an average TS 1 particle diameter of 20 nm is 200 m$^2$/g which matches the $S_{BJH}$ value calculated from BET data (Table 1). From FIG. 17B, it can be seen that the hexagonal structure of the starting material SBA phase (FIG. 16B) is transformed after the crystallization step. The diameter of the regularly arranged pores is significantly enlarged from 5 nm to 10 nm which matches the measured BJH pore diameter of 6.6 and 12.8 nm, respectively (Table 1). FIG. 17B also shows nanoparticles of TS-1 having grown to 10 nm size and being slightly agglomerated. The pore walls themselves show a discontinuous structure compared to the precursor suggesting that nucleation of UL-TS1 begins in these walls.

Figure 18A:
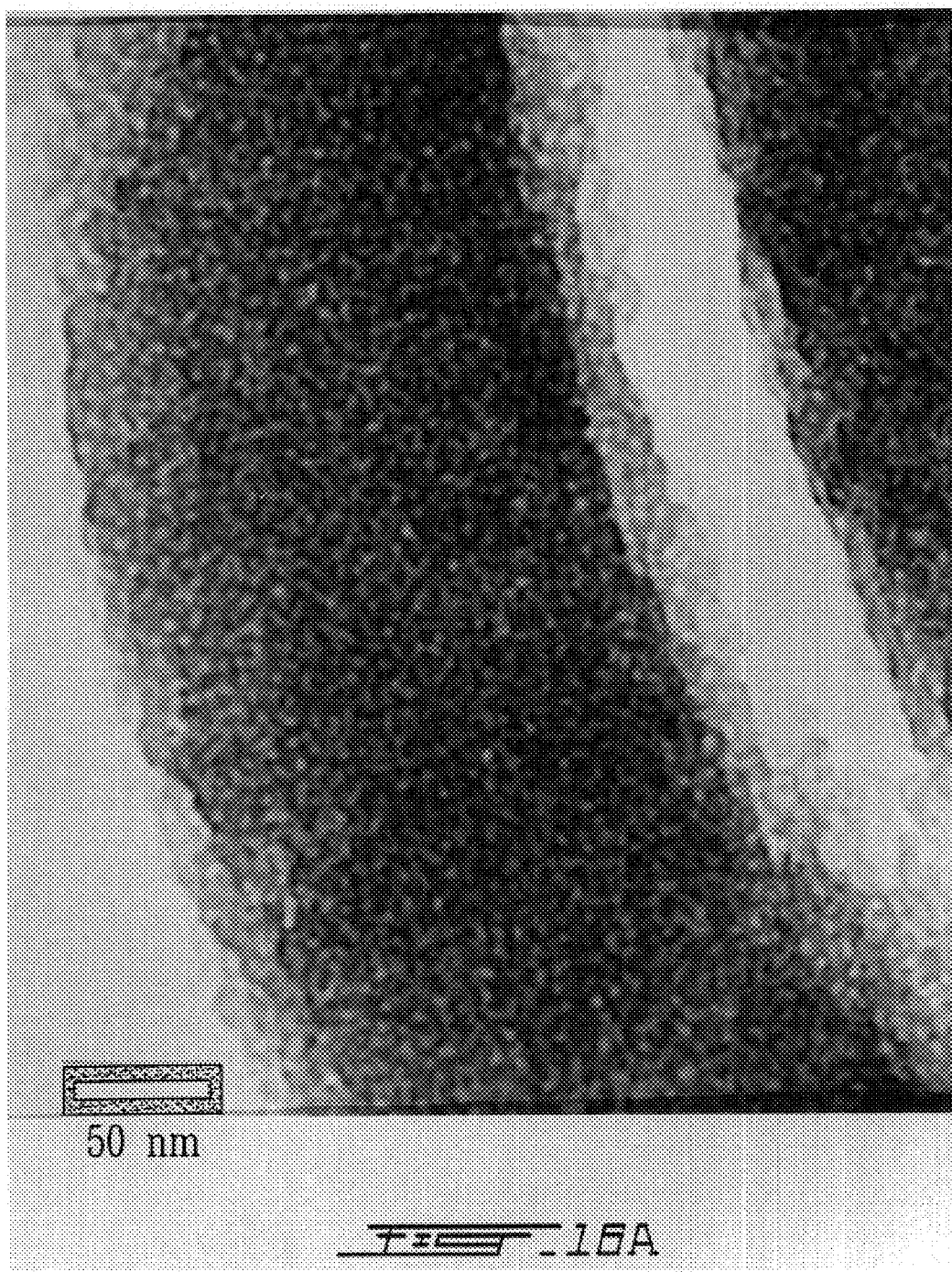
FIG. 18a shows a diffuse reflectance UV-Visible spectrum of the I-UL-TS1[1.5] sample after various times of crystallization: a) 0 days, b) 5 days and c) 10 days.
Figure 18B:
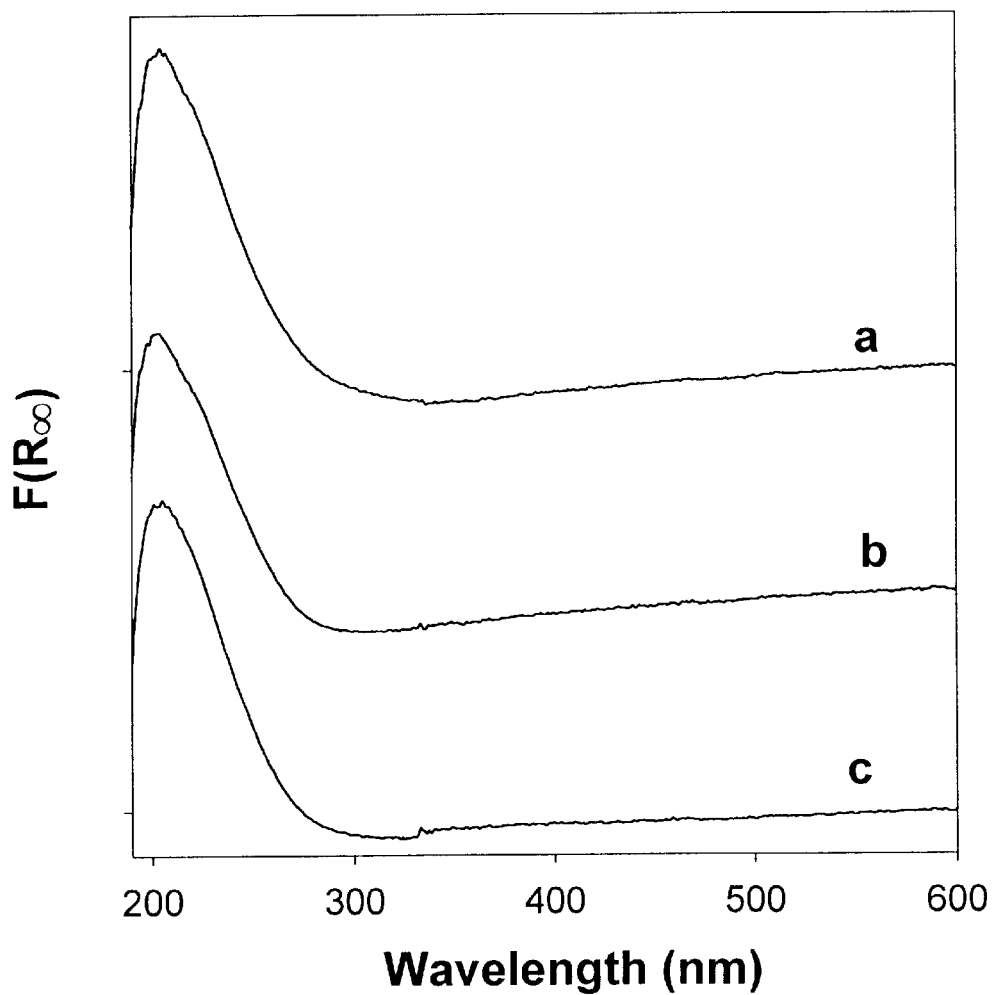
FIG. 18b shows a diffuse reflectance UV-Visible spectrum of the II-UL-TS 1[1.5] sample after various times of crystallization: a) 0 days, b) 5 days and c) 10 days.

UV-visible spectroscopy has been extensively used to characterize the nature and coordination of titanium ions in titanium substituted molecular sieves. The ultraviolet absorption wavelength of titanium is sensitive to its coordination and to $TiO_2$ particle size. FIGS. 18A and 18B show UV-visible spectra of two series of UL-TS1[1.5] samples prepared by route I and route II, with different crystallization times. Only a single intense large band at 230 nm was observed with all samples. This band was attributed to ligand-to-metal charge transfer associated with isolated $Ti^{4+}$ framework sites in tetrahedral coordination. No band at 330 nm characteristic of octahedral extra-framework titanium was observed. This suggests that all titanium is essentially incorporated in the UL-TS 1 framework.

Figure 19:
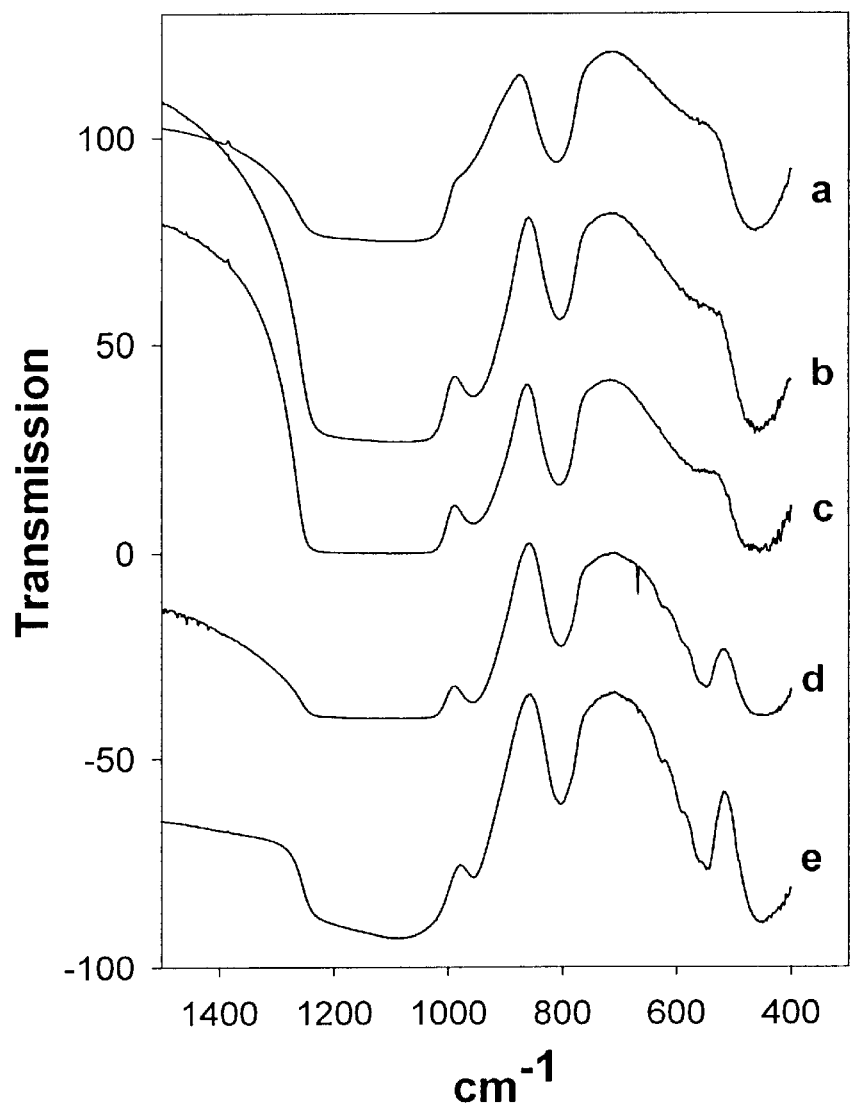
FIG. 19 shows FTIR spectra of: a) a calcined SBA silica sample and the II-UL-TS1[1.5] sample after various times of crystallization b) 0 days, c) 5 days, d) 8 days and e) 10 days.

FIG. 19 shows the FTIR spectra of a series of II[x]UL-TS1[1.5] samples with various times of crystallization. The pure SBA silica sample exhibits spectroscopic features similar to those of amorphous mesoporous silica, a broad bands at 985 cm$^{-1}$ assigned to silanol groups on the wall surface is present (FIG. 19a). However, for the II[0]UL-TS1[1.5] sample, a band at 965 cm$^{-1}$ which is characteristic of framework titanium is shown and no band at 550 cm$^{-1}$ was observed. The band at 985 cm$^{-1}$ disappears progressively, while the bands at 550 and 965 cm$^{-1}$ develop with increasing crystallization time. The corresponding FTIR spectra for the series I[x]UL-TS1[1.5] are similar to those in FIG. 19. Several researchers (P. A. Jacobs et al, J. Chem. Soc., Chem. Commun., p. 591 (1981); B. J. Shoeman, Stud. Surf. Sci. Catal., Vol. 105, p. 647 (1997)) have assigned the 550 cm$^{-1}$ band to the asymmetric stretching mode of the five-membered ring present in ZSM-5 which should therefore be an indication of the presence of the MFI structure of UL-TS1. Splitting of this lattice-sensitive band into a doublet has been observed in nanophase silicalite. The FTIR spectra of the samples in FIG. 19 show the doublet band at 561/547 cm$^{-1}$ and the band at 965 cm$^{-1}$ which are characteristic of nanocrystals and titanium framework, respectively.

Figure 20:
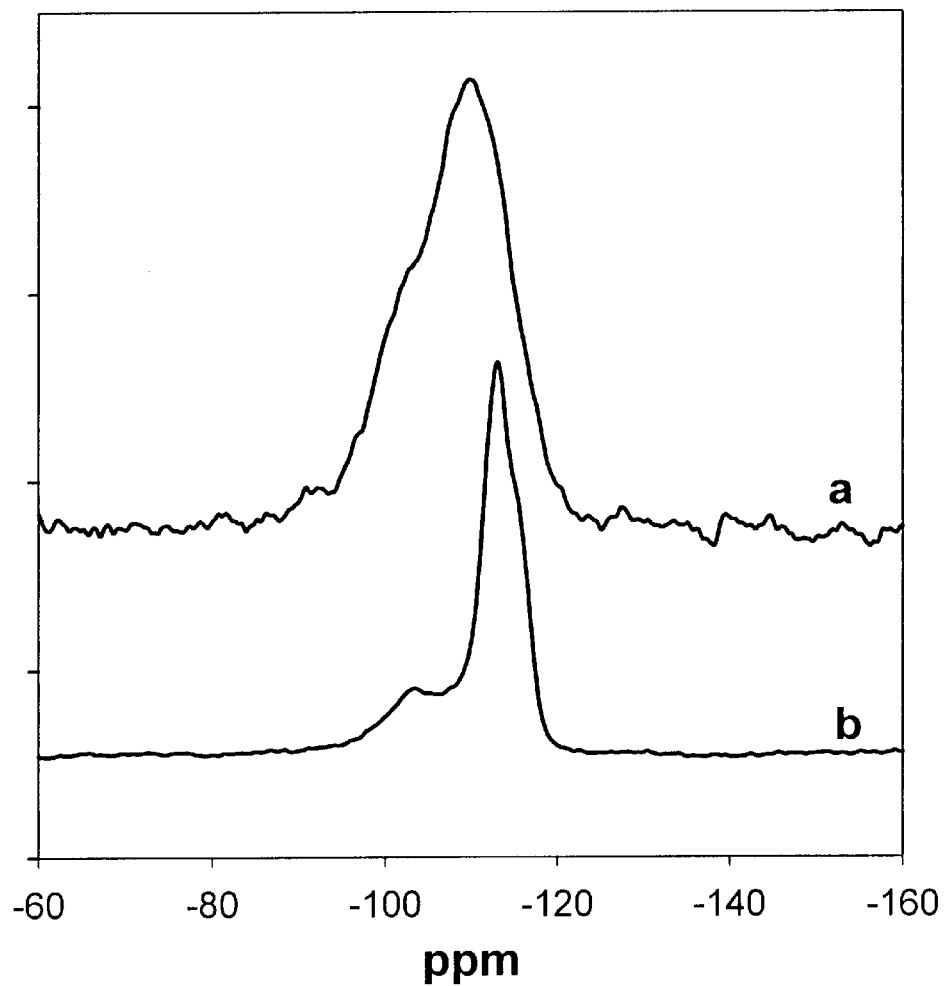
FIG. 20 shows $^{29}$Si MAS-NMR spectra of: a) a calcined starting material used in Example 4 and b) the I-[10]UL-TS1[1.5] sample.

FIG. 20 shows the $^{29}$Si MAS NMR spectra of the amorphous mesoporous Ti-material, I[0]UL-TS1[1.5], and of the sample obtained after 10 days of crystallization, I[10]UL-TS1[1.5]. The mesoporous titania-silica exhibits a $^{29}$Si MAS NMR spectrum typical of amorphous materials; two main resonances at −114 and 104 ppm, and a very weak peak at 98 ppm correspond to $Si(OSi)_4$ ($Q^4$), $Si(OSi)_3$ ($Q^3$) and $Si(OSi)_2$ ($Q^2$) silicate species, respectively. The ratio of the relative peak areas of the deconvoluted peaks, $Q^4/Q^3$ was 1.8. This ratio was comparable with other calcined amorphous mesoporous silicas. Upon crystallization for 10 days in the presence of the $TPA^+$ structure-directing agent, the $^{29}$Si MAS NMR spectrum showed the main resonance ($Q^4$) at −114 ppm along with the only weak resonance ($Q^3$) at 104 ppm from surface hydroxyl groups and the resonance ($Q^2$) at 98 ppm had disappeared. The $^{29}$Si MAS NMR spectra of series II[x]UL-TS1[1.5] show the same trends and are therefore not reported here. The increase in the intensity of the $Q^4$ resonance and concomitant decrease in the intensity of the $Q^3$ resonance reflect the crystallization process and the transformation of the hydrophilic surface into a hydrophobic one.

Figure 21:
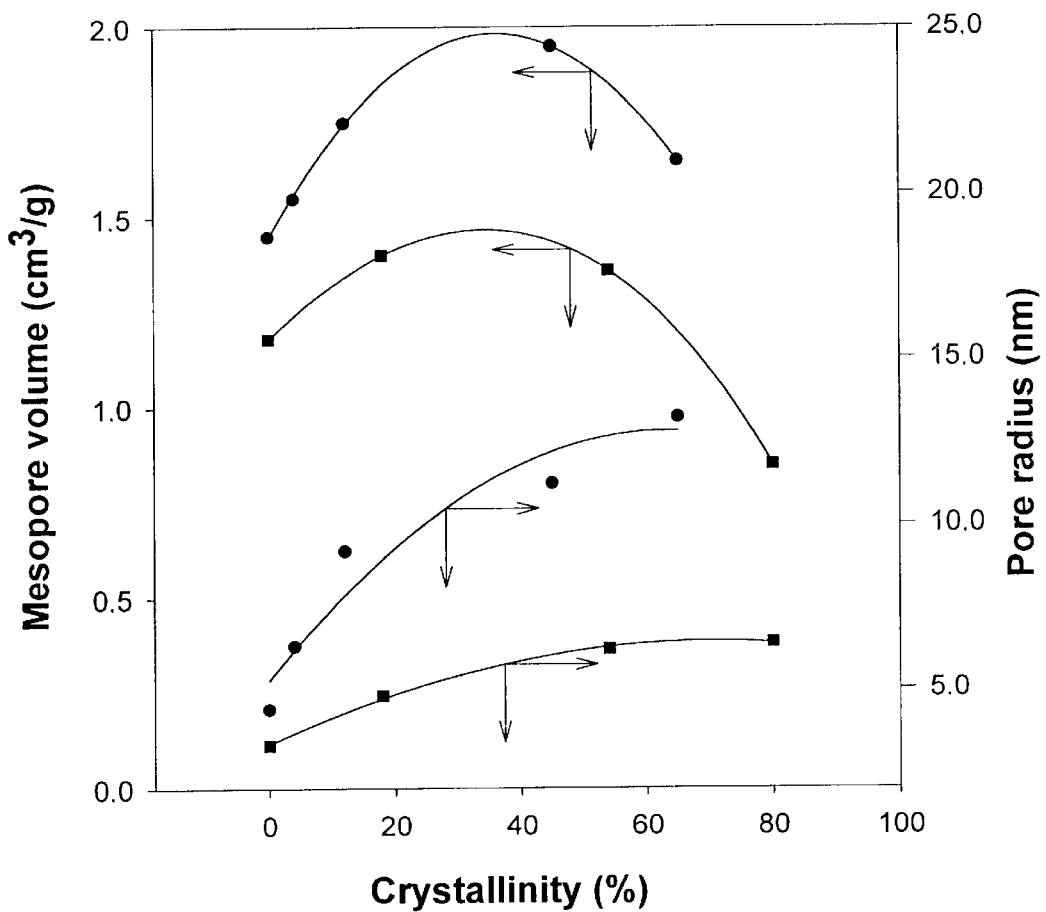
FIG. 21 shows the evolution of the mesopore volume and average radius of the I-UL-TS1[1.5] sample (●) and II-UL-TS1[1.5] sample (■) as a function of the percentage of crystallinity.

As shown in both Table 1 and FIG. 21, the mesopore volume and pore radius increase with crystallinity until ~35%. It is believed that in these conditions, the pore walls shrink due to the change in density associated with the formation of the crystalline silicalite phase. At higher crystallinity, the mesopore volume begins to decrease even though the mesopore size is little affected. This corresponds to the migration of the material constituting the walls which contributes to the extra-walls growth of silicalite nanoparticles (FIG. 17B). This process results in an important damage to the initial regularity of the mesopore network, but a significant fraction of the initial mesopore surface is preserved in the end product.

TABLE 1

| Materials (1) | Crys. time (days) | $S_{BET}$ (m$^2$/g) | $S_{BJH}$ (m$^2$/g) | Micropore volume (cm$^3$/g) | Mesopore volume (cm$^3$/g) | Pore radius (nm) | Crystallinity (%) |
|---|---|---|---|---|---|---|---|
| [0]UL-ZSM-5 [1.0] | 0 | 865 | 745 | 0.020 | 1.25 | 4.4 | — |
| [1]UL-ZSM-5 [1.0] | 1 | 825 | 560 | 0.100 | 1.83 | 7.5 | — |
| [2]UL-ZSM-5 [1.0] | 2 | 645 | 275 | 0.145 | 1.86 | 11.2 | 14 |
| [5]UL-ZSM-5 [1.0] | 5 | 565 | 130 | 0.158 | 1.25 | 13.2 | 48 |
| [5]UL-ZSM-5 [3.0] | 5 | 480 | 125 | 0.148 | 1.12 | 13.6 | 52 |
| [2]UL-silicalite [0] | 2 | 420 | 110 | 0.148 | 0.52 | 9.0 | 85 |
| [3]UL-Beta [1.0] | 3 | 560 | 123 | 0.156 | 0.48 | 9.3 | 76 |

Crystallization temperature: 130° C.
(1) [x]UL-zeolite[y] where x and y: crystallization time in days and percentage (%) of Al/Si atomic ratio, respectively.

TABLE 2

| Materials (1) | Crys. time (days) | $S_{BET}$ (m²/g) | $S_{BJH}$ (m²/g) | Micropore volume (cm³/g) | Mesopore volume (cm³/g) | Pore radius (nm) | Crystallinity (%) |
|---|---|---|---|---|---|---|---|
| I-[0]UL-TS1 [0.5] | 0 | 760 | 680 | 0.038 | 1.62 | 4.2 | — |
| I-[5]UL-TS1 [0.5] | 5 | 620 | 450 | 0.095 | 1.72 | 9.6 | 18 |
| I-[0]UL-TS1 [1.5] | 0 | 820 | 645 | 0.045 | 1.45 | 4.4 | — |
| I-[3]UL-TS1 [1.5] | 3 | 710 | 495 | 0.082 | 1.55 | 6.3 | — |
| I-[5]UL-TS1 [1.5] | 5 | 680 | 405 | 0.123 | 1.75 | 9.2 | 12 |
| I-[8]UL-TS1 [1.5] | 8 | 655 | 310 | 0.145 | 1.95 | 11.2 | 45 |
| I-[10]UL-TS1 [1.5] | 10 | 580 | 180 | 0.159 | 1.65 | 13.2 | 65 |
| II-[0]UL-TS1 [1.5] | 0 | 790 | 710 | 0.025 | 1.18 | 3.3 | — |
| II-[5]UL-TS1 [1.5] | 5 | 730 | 440 | 0.103 | 1.40 | 4.8 | 18 |
| II-[8]UL-T 1 [1.5] | 8 | 705 | 380 | 0.103 | 1.36 | 6.2 | 54 |
| II-[10]UL-TS1 [1.5] | 10 | 520 | 145 | 0.149 | 0.85 | 6.4 | 80 |

I/II-[x]UL-T 1 [y] where I/II: route I or II for the preparation of the starting material; x and y: crystallization time in days and percentage (%) of Ti/Si atomic ratio.

We claim:

1. A mesoporous zeolitic material having a stereoregular arrangement of uniformly-sized mesopores with diameters ranging from 20 to 500 Å and walls having a thickness of at least 40 Å and a microporous nanocrystalline structure, the mesopore walls having a stereoregular arrangement of uniformly-sized micropores with diameters less than 15 Å.

2. A material as claimed in claim 1, wherein said mesopores have diameters ranging from 30 to 300 Å.

3. A material as claimed in claim 1, wherein said micropores have diameters ranging from 3 to 12 Å.

4. A material as claimed in claim 1, wherein said mesopore walls each have a thickness of 40 to 80 Å.

5. A material as claimed in claim 1, wherein said mesopore walls are formed of silicalite.

6. A material as claimed in claim 1, wherein said mesopore walls are formed of tinanium-containing silicalite.

7. A material as claimed in claim 1, wherein said mesopore walls are formed of ZSM-type zeolite.

8. A material as claimed in claim 7, wherein said ZSM-type zeolite is ZSM-5 zeolite.

9. A material as claimed in claim 1, wherein said mesopore walls are formed of beta-zeolite.

10. A method of preparing a mesoporous zeolitic material as defined in claim 1, comprising the steps of:

a) providing a mesoporous silica having a stereoregular arrangement of uniformly-sized mesopores having diameters ranging from 20 to 500 Å and walls having a thickness of at least 40 Å and an amorphous structure;

b) impregnating said mesoporous silica with a zeolite-templating compound;

c) subjecting the impregnated mesoporous silica obtained in step (b) to a heat treatment at a temperature and for a period of time sufficient to cause transformation of said amorphous structure into a microporous nanocrystalline structure, thereby obtaining a mesoporous zeolitic material with mesopore walls having a stereoregular arrangement of uniformly-sized micropores with diameters less than 15 Å; and d) removing said zeolite-templating compound from the mesoporous zeolitic material obtained in step (c).

11. A method as claimed in claim 10, wherein said mesoporous silica contains aluminum or titanium.

12. A method as claimed in claim 10, wherein prior to step (b), said mesoporous silica is treated under vacuum at a temperature ranging from 25 to 100° C.

13. A method as claimed in claim 10, wherein said zeolite-templating compound is used in the form of an aqueous solution.

14. A method as claimed in claim 13, wherein said zeolite templating compound is tetraethylammonium hydroxyde or tetrapropylammonium hydroxide.

15. A method as claimed in claim 13, wherein prior to step (c), the impregnated mesoporous silica is dried under vacuum.

16. A method as claimed in claim 13, wherein (c) is carried out in the presence of water vapor.

17. A method as claimed in claim 10, wherein step (c) is carried out at a temperature ranging from 80 to 180° C.

18. A method as claimed in claim 17, wherein step (c) is carried out for a period of time ranging from 1 hour to 10 days.

19. A method as claimed in claim 18, wherein step (c) is carried out at a temperature of 120 to 130° C. and for a period of time ranging from 24 to 48 hours.

20. A method as claimed in claim 10, wherein step (d) is carried out by calcining the mesoporous zeolitic material obtained in step (c).

21. A method as claimed in claim 20, wherein prior to step (d), the mesoporous zeolitic material obtained in step (c) is subjected to a drying treatment.

22. A method as claimed in claim 10, wherein the mesoporous silica provided in step (a) is obtained by:

i) dissolving a micelle-forming surfactant in a polar solvent to form a solution;

ii) mixing the solution obtained in step (i) with a silica precursor;

iii) heating the mixture resulting from step (ii) to cause simultaneous formation of tubular micelles and precipitation of amorphous silica thereonto; and iv) separating the tubular micelles with the amorphous silica thereon from the solvent.

23. A method as claimed in claim 22, wherein the micelle-forming surfactant is a non-ionic surfactant.

24. A method as claimed in claim 23, wherein the non-ionic micelle-forming surfactant is a poly(alkylene oxide) block copolymer.

25. A method as claimed in claim 24, wherein the poly(alkylene oxide) block copolymer is selected from the group consisting of:

$HO(CH_2CH_2O)_{20}(CH_2CH(CH_3)O)_{70}(CH_2CH_2O)_{20}H$,
$HO(CH_2CH_2O)_{106}(CH_2CH(CH_3)O)_{70}(CH_2CH_2O)_{106}H$,
$C_{16}H_{33}(OCH_2CH_2)_{10}OH$,
$C_{16}H_{33}(OCH_2CH_2)_{20}OH$, and
$C_{18}H_{37}(OCH_2CH_2)_{10}OH$.

26. A method as claimed in claim 22, wherein the polar solvent is water, a lower alkanol or a mixture thereof.

27. A method as claimed in claim 22, wherein in step (ii) the solution obtained in step (i) is mixed with said silica precursor and an aluminum or titanium source.

28. A method as claimed in claim 22, wherein step (iii) is carried out at a temperature ranging from 40 to 150° C.

29. A method as claimed in claim 22, further including the step of removing said surfactant from the separated micelles.

30. A method as claimed in claim 29, wherein removal of said surfactant is effected during removal of said zeolite-templating compound in step (d).

31. A method as claimed in claim 30, wherein removal of said surfactant and said zeolite-templating is effected by calcining the mesoporous zeolitic material obtained in step (c).

* * * * *